US010924009B2

United States Patent
Chen et al.

(10) Patent No.: US 10,924,009 B2
(45) Date of Patent: Feb. 16, 2021

(54) SYSTEM AND METHOD FOR CONTROLLING SWITCHING POWER SUPPLY

(71) Applicant: SEMICONDUCTOR COMPONENTS INDUSTRIES, LLC, Phoenix, AZ (US)

(72) Inventors: Gang Chen, Taipo (HK); Rong-Shyang Ou, San Jose, CA (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 712 days.

(21) Appl. No.: 15/461,658

(22) Filed: Mar. 17, 2017

(65) Prior Publication Data

US 2018/0269787 A1    Sep. 20, 2018

(51) Int. Cl.
| | |
|---|---|
| *H02M 3/158* | (2006.01) |
| *H02M 3/156* | (2006.01) |
| *H02M 1/08* | (2006.01) |
| *H02M 1/00* | (2006.01) |

(52) U.S. Cl.
CPC .......... *H02M 3/156* (2013.01); *H02M 3/1584* (2013.01); *H02M 2001/0009* (2013.01); *H02M 2001/0054* (2013.01); *Y02B 70/10* (2013.01)

(58) Field of Classification Search
CPC ....... H02M 3/155; H02M 3/156–1588; H02M 2003/1566; Y02B 70/1491
See application file for complete search history.

(56) References Cited

U.S. PATENT DOCUMENTS

| | | | |
|---|---|---|---|
| 6,683,441 B2 | 1/2004 | Schiff et al. | |
| 7,446,517 B2 | 11/2008 | Chen et al. | |
| 7,595,617 B2 | 9/2009 | Schiff | |
| 7,969,134 B2 * | 6/2011 | Chen .................... | H02M 3/156 323/285 |
| 9,007,048 B2 | 4/2015 | Chen et al. | |
| 2010/0270995 A1 * | 10/2010 | Laur ..................... | H02M 3/156 323/285 |
| 2012/0049826 A1 * | 3/2012 | Hsu ..................... | H02M 3/1588 323/284 |

OTHER PUBLICATIONS

Richard Redl, and Jian Sun, "Ripple-Based Control of Switching Regulators—An Overview", IEEE Trans. on Power Electronics, vol. 24, No. 12, Dec. 2009, pp. 2669-2680.

* cited by examiner

Primary Examiner — Thienvu V Tran
Assistant Examiner — Ivan Laboy
(74) Attorney, Agent, or Firm — AMPACC Law Group, PLLC

(57) ABSTRACT

A method includes converting an input signal into an output signal in response to a modulation signal, generating a timeout signal in response to the modulation signal, generating a comparison signal according to the output signal, determining whether the comparison signal is equal to or greater than a sense signal, determining whether the timeout signal has a first logic value, and causing the modulation signal to have the first logic value when the comparison signal is equal to or greater than the sense signal and the timeout signal has the first logic value. A switching power supply circuit includes a power converter, a timer circuit generating the timeout signal, and a controller causing the modulation signal to have the first logic value when the comparison signal is equal to or greater than the sense signal and the timeout signal has the first logic value.

22 Claims, 12 Drawing Sheets

US 10,924,009 B2

SYSTEM AND METHOD FOR CONTROLLING SWITCHING POWER SUPPLY

BACKGROUND

This present disclosure relates to integrated circuit devices, and more particularly to a switching power supply.

A conventional switching power supply may include a ripple based controller, a fixed-frequency controller, or an active power controller. The ripple based controller, such as a constant on-time (COT) controller or a ramp pulse modulation (RPM) controller, may result in large switching frequency variations under certain combinations of operating conditions.

The fixed-frequency controller, such as a fixed-frequency pulse width modulated (PWM) controller, often does not provide a quick transient response under a load transient condition. In addition, the fixed-frequency PWM controller often has beat frequencies under a high frequency repetitive load transient condition.

The active power controller may have a complicated structure including a multiplier. In addition, the active power controller often does not show a smooth transition between a discontinuous current mode (DCM) and a continuous current mode (CCM).

SUMMARY

In an embodiment, a switching power supply includes a power converter converting an input signal into an output signal in response to a modulation signal, a timer circuit generating a timeout signal in response to the modulation signal, and a controller determining whether a comparison signal is equal to or greater than a sense signal, determining whether the timeout signal has a first logic value, and causing the modulation signal to have the first logic value when the comparison signal is equal to or greater than the sense signal and the timeout signal has the first logic value.

In an embodiment, a method for controlling a switching power supply includes converting an input signal into an output signal in response to a modulation signal, generating a timeout signal in response to the modulation signal, generating a comparison signal according to the output signal, determining whether the comparison signal is equal to or greater than a sense signal, determining whether the timeout signal has a first logic value, and causing the modulation signal to have the first logic value when the comparison signal is equal to or greater than the sense signal and the timeout signal has the first logic value.

DETAILED DESCRIPTION

Figure 1:
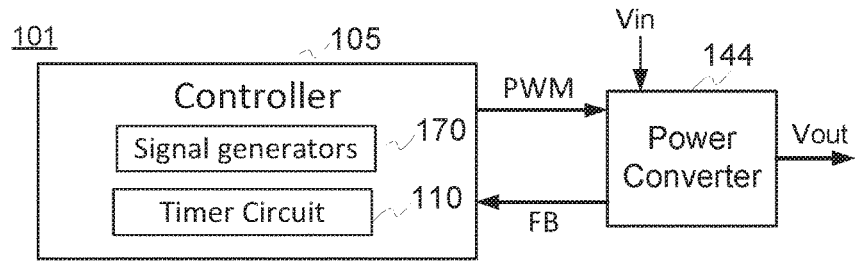
FIG. 1 illustrates a block diagram illustrating a switching power supply, according to an embodiment.

FIG. 1 is a block diagram illustrating a switching power supply 101 according to an embodiment. The switching power supply 101 includes a controller 105 and a power converter 144.

The power converter 144 converts an input signal (or an input voltage) Vin and provides an output signal (or an output voltage) Vout to a load (not shown). The load may include one or more integrated circuits (ICs). In an embodiment, the output voltage Vout is used as a supply voltage to one or more of a Central Processing Unit (CPU), a Graphics Processing Unit (GPU), a memory integrated circuit, and the like. The power converter 144 also provides a feedback signal FB indicative of a level of the output voltage Vout to the controller 105.

The controller 105 includes a timer circuit 110 generating a timeout signal and a plurality of signal generators 170. The plurality of signal generators 170 includes a comparison signal generator generating a comparison signal in response to the feedback signal FB, a current sense plus ramp (CSR) signal generator 120 generating a CSR signal, and first and second threshold signal generators 167 and 187 respectively generating first and second threshold signals. The controller 105 generates a pulse width modulated (PWM) signal (or a modulation signal) PWM according to the generated signals and provides the PWM signal to the power converter 144.

Figure 2:
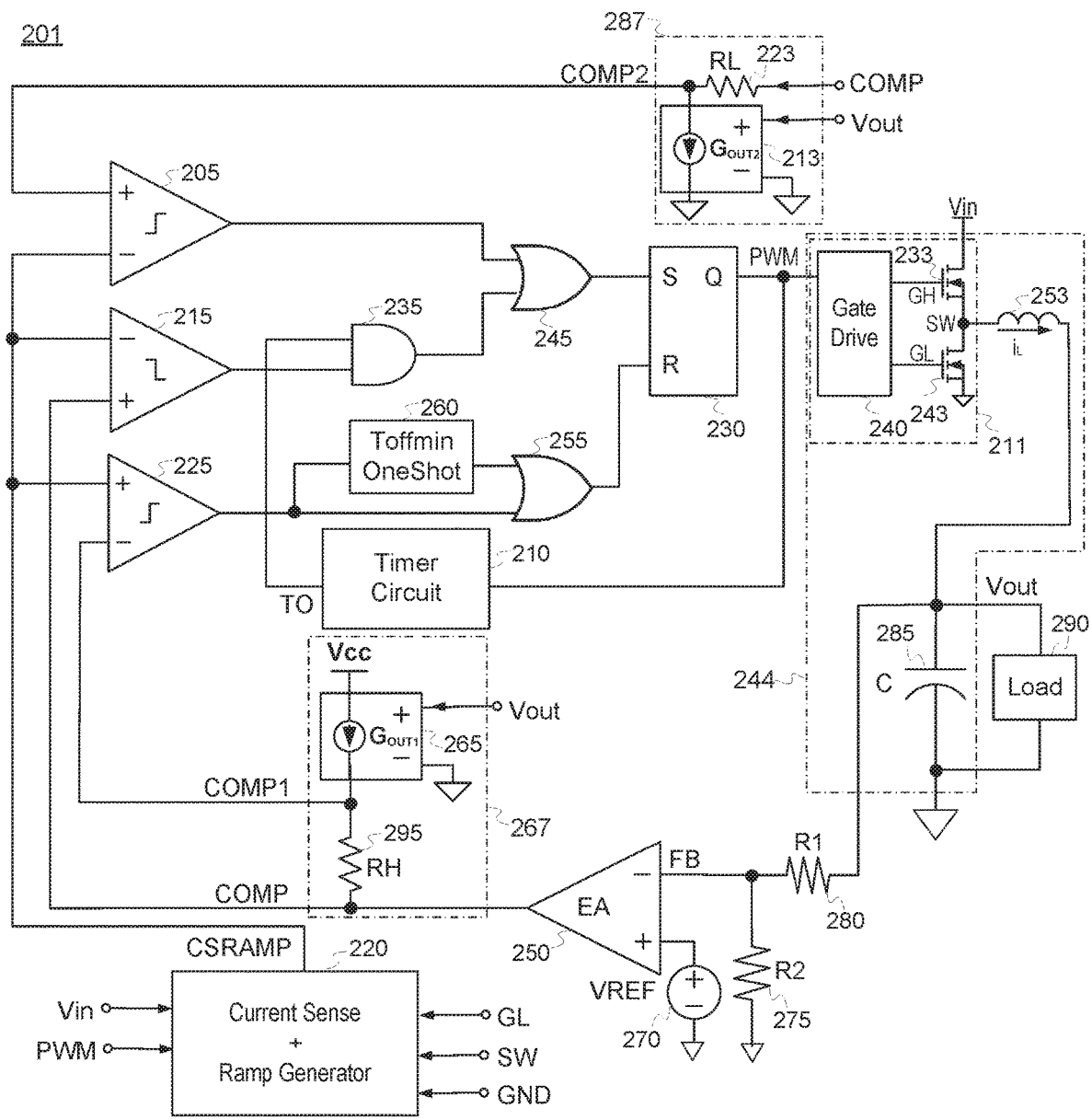
FIG. 2 illustrates a switching power supply suitable for use as the switching power regulator of FIG. 1, according to an embodiment.

FIG. 2 illustrates a switching power supply 201 suitable for use as the switching power regulator 101 of FIG. 1, according to an embodiment. The switching power supply 201 includes a power converter 244, which includes a driver and switch circuit 211, an output inductor 253, and an output capacitor 285. The power converter 244 receives an input voltage Vin and a pulse width modulation (PWM) signal PWM and converts the received input voltage Vin into an output voltage Vout in response to the PWM signal PWM. The output voltage Vout is supplied to a load 290.

The driver and switching circuit 211 includes a gate drive circuit 240, a high drive transistor 233, and a low drive transistor 243. The gate drive circuit 240 generates a drive high signal GH and a drive low signal GL according to a value of the PWM signal PWM. The drive high signal GH and the drive low signal GL are respectively connected to control terminals (e.g., gates) of the high drive transistor 233 and the low drive transistor 243.

In an embodiment, when the PWM signal PWM has a first logic value (e.g., a logic high value), the gate drive circuit 240 generates a drive high signal GH to turn the high drive transistor 233 on and a drive low signal GL to turn the low drive transistor 243 off. Because the high drive transistor 233 is on and the low drive transistor 243 is off, an inductor current $i_L$ may flow from the input voltage Vin to the output capacitor 285 and the load 290, and energy is stored in a magnetic field of the inductor 253. When the PWM signal PWM has a second logic value (e.g., a logic low value), the gate drive circuit 240 generates a drive high signal GH to turn the high drive transistor 233 off and a drive low signal GL to turn the low drive transistor 243 on. Because the high drive transistor 233 is off and the low drive transistor 243 is on, and the energy stored in the magnetic field of the inductor 253 may be transferred to the output capacitor 285 and the load 290.

The switching power supply 201 further includes a controller. The controller includes an error amplifier (EA) 250, first and second resistors 280 and 275, a reference voltage source 270, a first threshold signal generator 267, a second threshold signal generator 287, a first comparator 205, a second comparator 215, a third comparator 225, a Current Sense plus Ramp (CSR) signal generator 220, a timer circuit 210, and a set/reset (RS) flip-flop 230. The controller further includes an AND gate 235, first and second OR gates 245 and 255, a minimum off-time circuit 260.

The EA 250 receives a feedback voltage FB and a reference voltage VREF and generates a comparison signal COMP having a value that is proportional to a difference between the feedback voltage FB and the reference voltage VREF. The feedback voltage FB is generated from the output voltage Vout using a voltage divider comprising the first and second resistors 280 and 275, and has a level represented by Equation 1 below:

$$FB = Vout*R2/(R1+R2) \quad \quad \text{Equation 1.}$$

In Equation 1, R1 denotes a resistance value of the first resistor 280 and R2 denotes a resistance value of the second resistor 275.

In an embodiment, the EA 250 includes a compensation network (not shown) incorporating resistors and capacitors. For example, such a compensation network (not shown) may be connected between a node receiving the comparison signal COMP, a node receiving the output voltage Vout, and an inverting input of the EA 250, or may be connected between a node receiving the comparison signal COMP and the feedback signal FB and a ground.

The first threshold signal generator 267 includes a first adaptive current source 265 and a third resistor 295. The first adaptive current source 265 receives the output voltage Vout and generates a first current having a magnitude that is proportional to a level of the output voltage Vout. The third resistor 295 has a first end connected to the first adaptive current source 265 and a second end receiving the comparison signal COMP output from the EA 250. When the first current flows through the third resistor 295, the first threshold signal generator 267 generates a first threshold signal COMP1 at the first end of the third resistor 295. The first threshold signal COMP1 can be represented by Equation 2 below:

$$COMP1 = COMP + V_{TH1} = COMP + G_{out1}*V_{out}*R_H = COMP + k_1*V_{out} \quad \quad \text{Equation 2.}$$

In Equation 2, $V_{TH1}$ denotes a first threshold voltage, $G_{out1}$ denotes a first adaptive current gain, $R_H$ denotes a resistance value of the third resistor 295, and $k_1$ denotes a first scaling factor.

The second threshold signal generator 287 includes a second adaptive current source 213 and a fourth resistor 223. The second adaptive current source 287 receives the output voltage Vout and generates a second current having a magnitude that is proportional to a level of the output voltage Vout. The fourth resistor 223 has a first end connected to the second adaptive current source 287 and a second end receiving the comparison signal COMP output from the EA 250. When the second current flows through the fourth resistor 223, the second threshold signal generator 287 generates a second threshold signal COMP2 at the first end of the fourth resistor 223. The second threshold signal COMP2 can be represented by Equation 3 below:

$$COMP2 = COMP - V_{TH2} = COMP - G_{out2}*V_{out}*R_L = COMP - k_2*V_{out} \quad \quad \text{Equation 3.}$$

In Equation 3, $V_{TH2}$ denotes a second threshold voltage, $G_{out2}$ is a second adaptive current gain, $R_L$ denotes a resistance value of the fourth resistor 223, and $k_2$ denotes a second scaling factor.

The CSR signal generator 220 receives the input voltage Vin, the PWM signal PWM, the drive low signal GL, a ground signal GND, and a switching node signal SW. The switching node signal SW is generated at a first end of the inductor 253.

The CSR signal generator 220 outputs a CSR signal CSRAMP according to the received signals Vin, PWM, GL, SW, and GND. In an embodiment, when the PWM signal PWM has a logic high value, the CSR signal generator 220 generates the CSR signal CSRAMP having a ramp waveform. For example, the CSR signal CSRAMP may have a slew rate $SR_{CSRAMP}$ as represented in Equation 4 below:

$$SR_{CSRAMP} = k_3*V_{in}/T_{SW} \quad \quad \text{Equation 4.}$$

In Equation 4, $k_3$ denotes a third scaling factor and $T_{SW}$ is a nominal switching period corresponding to a nominal switching frequency $F_{SW}$ of the switching power supply 201. When the PWM signal PWM has a logic low value, the CSR signal generator 220 generates the CSR signal CSRAMP having a waveform representative of the inductor current $i_L$ flowing through the inductor 253.

The timer circuit 210 receives the PWM signal PWM and generates a timeout signal TO according to the received PWM signal. In an embodiment, the timer circuit 210 starts to output the timeout signal TO having a logic low value from a time corresponding to a rising edge of the PWM signal PWM, and keeps outputting the timeout signal TO during a time interval equal to the nominal switching period $T_{SW}$. Subsequently, the timer circuit 210 starts to output the timeout signal TO having a logic high value.

Hereinafter, an operation of the switching power supply 201 of FIG. 2 will be described below with reference to FIG.

Figure 3:
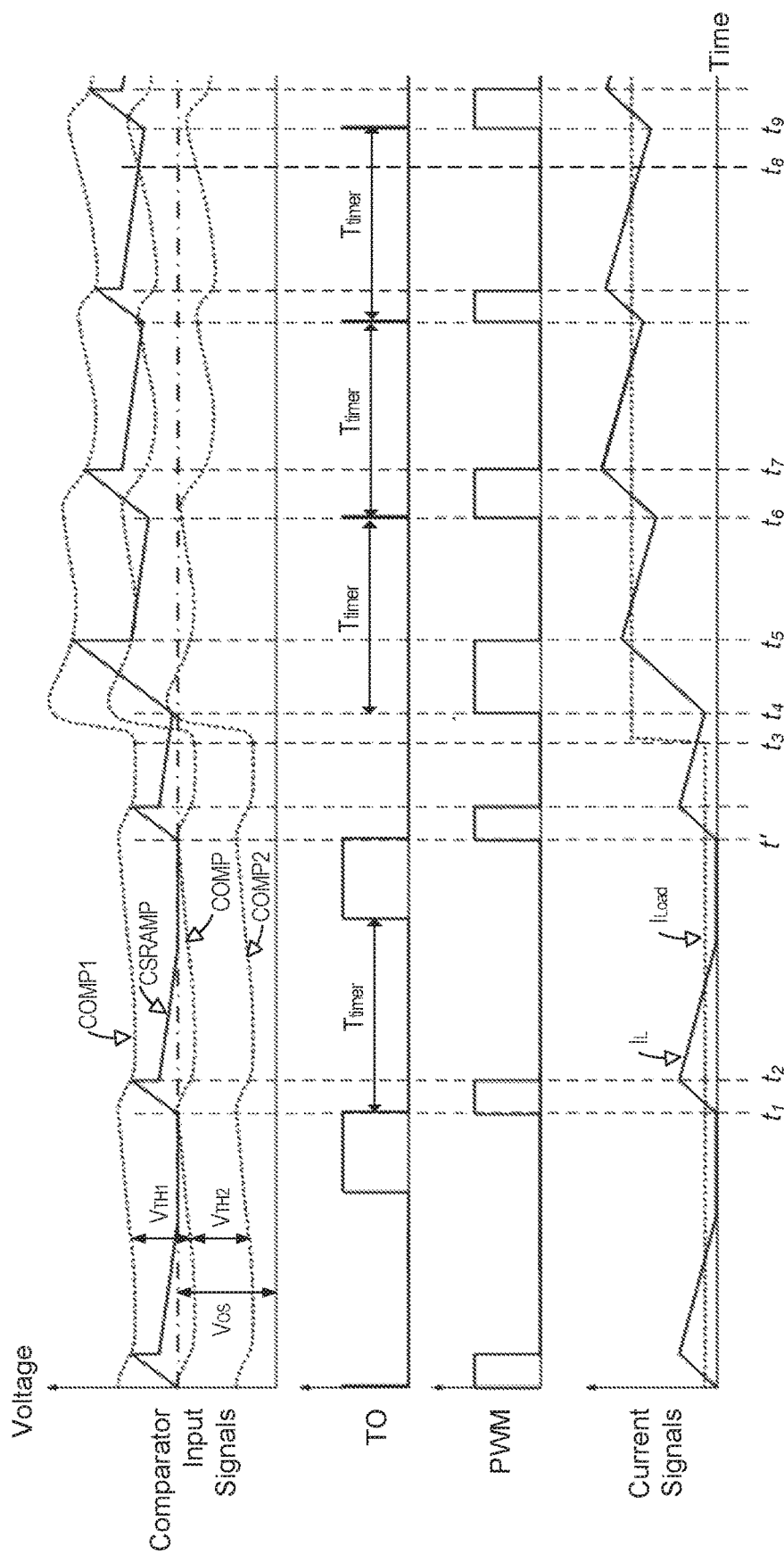
FIG. 3 illustrates waveforms related to an operation of the switching power supply of FIG. 2, according to an embodiment.

3. FIG. 3 illustrates the comparison signal COMP, the first threshold signal COMP1, the second threshold signal COMP2, and the CSR signal CSRAMP. FIG. 3 further illustrates a waveform of the timeout signal TO output from the timer circuit 210, a waveform of the PWM signal PWM, and waveforms of the inductor current $i_L$ and a load current $i_{Load}$.

When the switching power supply 201 operates in a discontinuous current mode (DCM), because an amount of energy required by the load 290 is small, the inductor current $i_L$ flowing through the inductor 253 falls to zero during portion of the switching period. In the DCM, the output voltage Vout decreases slowly and the comparison signal COMP increases slowly. As a result, before the comparison signal COMP reaches the CSR signal at a first time $t_1$, the timeout signal TO has been asserted to have the logic high value.

At the first time $t_1$, the value of the comparison signal COMP becomes greater than or equal to a value of the CSR signal CSRAMP, and thus the second comparator 215 outputs a signal indicative of a logic high value to the AND gate 235. Because the timeout signal TO has been asserted prior to the first time $t_1$, the AND gate 235 outputs a signal having a logic high value to the first OR gate 245. As a result, the first OR gate 245 outputs a set signal SET having a logic high value, which causes the RS flip-flop 230 to output the PWM signal PWM indicative of a logic high value. The PWM signal PWM having the logic high value resets the timer circuit 210, and thus the timer circuit 210 outputs the timeout signal TO having the logic low value from the first time $t_1$ during a timer period $T_{timer}$, which is equal to the nominal switching period $T_{SW}$. When the PWM signal PWM has the logic high value, the CSR generator 220 generates the CSR signal CSRAMP having a ramp waveform and thus the CSR signal increases until a value of the CSR signal CSRAMP is greater than or equal to the first threshold signal COMP1.

At a second time $t_2$, the value of the CSR signal CSRAMP becomes greater than or equal to a value of the first threshold signal COMP1, and thus the third comparator 225 outputs a signal indicative of a logic high value to the second OR gate 255. The second OR gate 255 outputs a reset signal RESET indicative of a logic high value, and thus the second OR gate 255 causes the RS flip-flop 230 to output the PWM signal PWM indicative of a logic low value. When the PWM signal PWM has the logic low value, the CSR generator 220 generates the CSR signal CSRAMP having a waveform representative of the inductor current $i_L$. Because the inductor current $i_L$ decreases and remains substantially equal to zero as shown in FIG. 3, the CSR signal also decreases and remains substantially equal to an offset voltage $V_{OS}$ as shown in FIG. 3. Furthermore, in response to the third comparator 225 outputting a signal indicative of a logic high value at the second time $t_2$, the minimum off-time circuit 260 is triggered, causing the minimum off-time circuit 260 to output a logic high value for a predetermined time period. After the predetermined time period, the minimum off-time circuit 260 outputs a logic low value.

As soon as the CSR signal CSRAMP has a value less than the first threshold signal COMP1, the third comparator 225 outputs the signal indicative of a logic low value to the second OR gate 255. However, because the minimum off-time circuit 260 outputs a signal indicative of a logic high value to the second OR gate 255 during a predetermined time period after the second time $t_2$, the second OR gate 255 keeps outputting the reset signal RESET indicative of the logic high value during the predetermined time period, ensuring proper operations of the gate driver and switch circuit 211 and the CSR signal generator 220.

At a third time $t_3$, the load current $i_{LOAD}$ increases under a step load transient condition, and thus the output capacitor 285 is rapidly discharged to reduce the level of the output voltage Vout, leading to a sudden increase in the value of the comparison signal COMP. As a result, the second threshold signal COMP2 increases at a sufficiently high rate to become greater than or equal to the CSR signal CSRAMP at a fourth time $t_4$, which is earlier than a time equal to a sum of the timer period $T_{timer}$ and a time t' at which the PWM signal PWM had most recently been asserted prior to the third time $t_3$.

A time interval between the third time $t_3$ and the fourth time $t_4$ is determined by, among other things, a level of the second threshold voltage $V_{TH2}$. For example, when the level of the second threshold voltage $V_{TH2}$ decreases, the time interval between the third time $t_3$ and the fourth time $t_4$ also decreases all else being equal. In an embodiment, the second threshold voltage $V_{TH2}$ is an adaptive voltage, as shown in Equation 3 above. In another embodiment, the level of the second threshold voltage $V_{TH2}$ is kept substantially constant.

At the fourth time $t_4$, the value of the second threshold signal COMP2 become greater than or equal to the value of the CSR signal CSRAMP, and thus the first comparator 205 outputs a signal indicative of a logic high value to the first OR gate 245. As a result, the first OR gate 245 outputs the set signal SET having the logic high value, which causes the RS flip-flop 230 to output the PWM signal PWM indicative of the logic high value.

Because the fourth time $t_4$ is earlier than the time equal to the sum of the time t' and the timer period $T_{timer}$, the timeout signal TO still has the logic low value at the fourth time $t_4$. Because the PWM signal PWM is asserted to reset the timer circuit 210 at the fourth time $t_4$, the timer circuit 210 keeps outputting the timeout signal TO that has the logic low value from the fourth time $t_4$ during the timer period $T_{timer}$.

When the PWM signal has the logic high value, the CSR generator 220 generates the CSR signal CSRAMP having a ramp waveform, and thus the CSR signal CSRAMP increases until the value of the CSR signal CSRAMP becomes greater than or equal to the value of the first threshold signal COMP1. Because the comparison signal COMP increases under the step load transient condition, the first threshold signal COMP1 also increases suddenly from the third time $t_3$ and the fourth time $t_4$, and then gradually decreases. As a result, a time interval between the fourth time $t_4$ and a fifth time $t_5$ during which the CSR signal CSRAMP increases until it becomes greater than or equal to the value of the first threshold signal COMP1 is greater than a time interval between the first time $t_1$ and the second time $t_2$. As a result, the PWM signal PWM has an on-time duration during time interval between the fourth time $t_4$ and a fifth time $t_5$, which is greater than an on-time duration during the time interval between the first time $t_1$ and the second time $t_2$.

As described above, under the step load transient condition, the PWM signal PWM is asserted at an earlier time (e.g., the fourth time $t_4$) than a corresponding time (e.g., the sum of the time t' and the timer period $T_{timer}$) under a normal operation condition (e.g., operating in the DCM). In addition, an on-time duration (e.g., the time interval between the fourth time $t_4$ and the fifth time $t_5$) of the PWM signal PWM under the step load transient condition is greater than an on-time duration (e.g., the time interval between the first time $t_1$ and the second time $t_2$) of the PWM signal PWM under the normal operation condition. As a result, the switching power supply 201 provides a fast transient response.

At a sixth time $t_6$, which corresponds to a time equal to the sum of the fourth time $t_4$ and the time period $T_{timer}$, the timer circuit 210 outputs the timeout signal TO having the logic high value. Because the value of the comparison signal COMP becomes greater than or equal to the value of the CSRAMP signal CSRAMP prior to the sixth time $t_6$, the RS flip-flop 230 outputs the PWM signal PWM having the logic high value, which resets the timer circuit 210. The RS flip-flop 230 keeps outputting the PWM signal PWM having the logic high value until the value of the CSR signal CSRAMP becomes greater than or equal to the value of the first threshold signal COMP1 at a seventh time $t_7$.

After the seventh time $t_7$, the switching power supply 201 operates in a continuous current mode (CCM), during which the inductor current $i_L$ does not fall to zero. When the switching power supply 201 operates in the CCM, a time (e.g., an eighth time $t_8$) at which the value of the comparison signal COMP becomes greater than or equal to the value of the CSR signal CSRAMP typically precedes a time (e.g., a ninth time $t_9$) at which the timeout signal TO is asserted.

In an embodiment, the first threshold voltage $V_{TH1}$ is $k_1*V_{out}$ as represented in Equation 2 and the slew rate $SR_{CRAMP}$ of the CSR signal CSRAMP is $k_3*V_{in}/T_{SW}$ as represented in Equation 4. In this embodiment, when the first scaling factor $k_1$ is equal to or less than the third scaling factor $k_3$, an intersecting frequency of the comparison signal COMP with the CSR signal CSRAMP becomes equal to or greater than the timer frequency, which is equal to the reciprocal of the timer period $T_{timer}$. As a result, when the switching power supply 201 operates in the CCM, the comparison signal COMP is likely to reach the CSR signal CSRAMP before the timeout signal TO is asserted. Because the comparison signal COMP has become greater than the CSR signal CSRAMP before the timeout signal TO is asserted, the RS flip-flop outputs the PWM signal PWM having the logic high value at a time (e.g., the ninth time $t_9$) when the timeout signal TO is asserted. Accordingly, in the CCM, the PWM signal PWM is asserted at the timer frequency corresponding to the timer period $T_{timer}$, and thus the switching frequency of the switching power supply 201 is substantially equal to the timer frequency that is constant.

As described above, when the switching power supply 201 operates in the CCM, the switching frequency remains substantially constant, so that issues (e.g., switching loss of the transistors 233 and 243 of FIG. 2 and frequency beating in repetitive load transient conditions) related to an undesirably high switching frequency in the switching power supply 201 may be avoided. In addition, the switching power supply 201 may provide a smoother transition between the DCM and the CCM, compared to a conventional switching power supply including a mode-change circuit.

Figure 4:
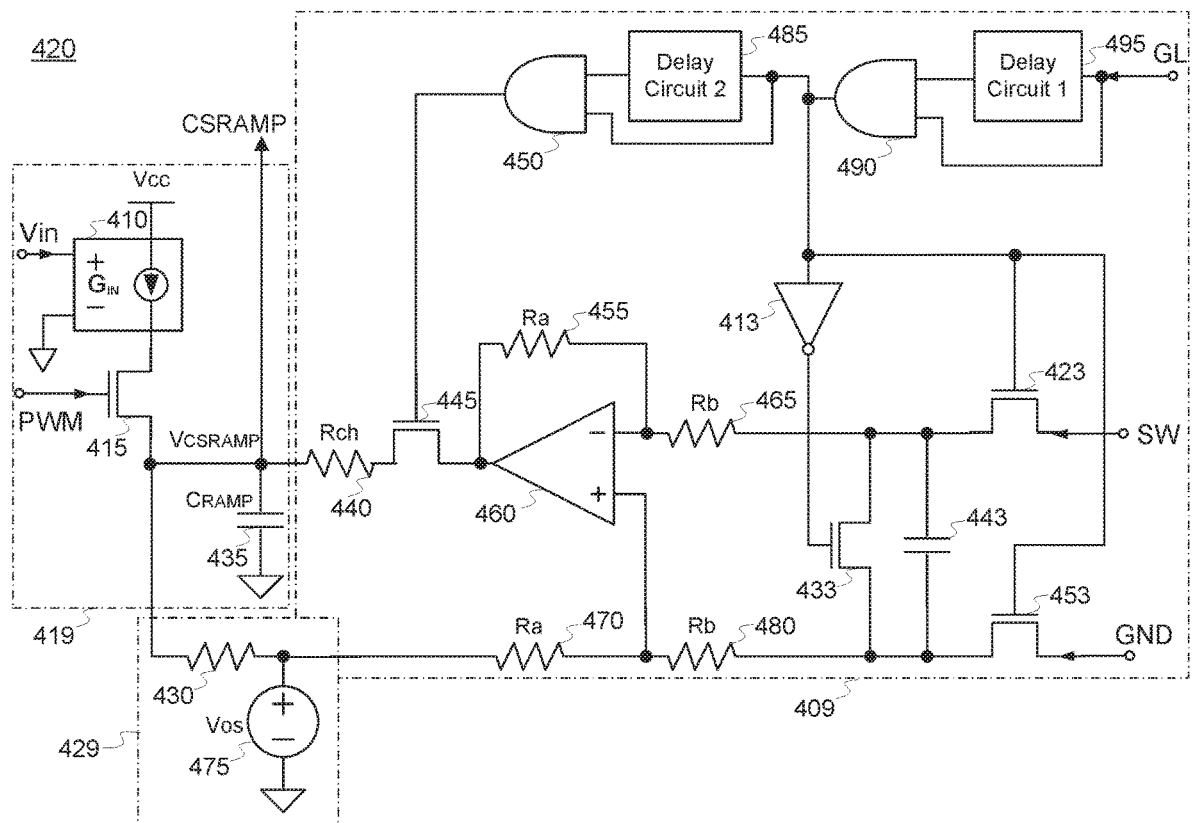
FIG. 4 illustrates a current sense plus ramp (CSR) signal generator according to an embodiment.

FIG. 4 illustrates a CSR signal generator 420 suitable for use as the CSR signal generator 220 of FIG. 2 according to an embodiment. The CSR signal generator includes a current sense circuit 409, a ramp generator 419, and an offset voltage generator 429.

The current sense circuit 409 includes the first and second delay circuits 495 and 485, first and second AND gates 490 and 450, an inverter 413, first, second, third, and fourth switching devices 423, 433, 453, and 445, a capacitor 443, first, second, third, fourth, and fifth resistors 455, 465, 470, 480, and 440, and an amplifier 460. The ramp generator 419 includes an adaptive current source 410, a fifth switching device 415, and a ramp capacitor 435. The offset voltage generator 429 includes an offset resistor 430 and an offset voltage source 475.

During an off-time duration of a PWM signal PWM (e.g., the PWM signal PWM of FIG. 2) during which the PWM signal PWM has a logic low value, a drive low signal GL has a logic high value. After a delay determined by the first delay circuit 495, the drive low signal GL having the logic high value operates to turn on the first and third switching devices 423 and 453 and turn off the second switching devices 433. After an additional delay determined by the second delay circuit 485, the drive low signal GL having the logic high value operates to turn on the fourth switching device 445. The PWM signal PWM having the logic low value turns off the fifth switching device 415. Accordingly, the current sense circuit 409 amplifies a switching node signal (or a switching node voltage) SW and provides the amplified version of the switching node signal SW to a first end of the ramp capacitor 435. A voltage level $V_{SCRAMP}$ of a CSR signal CSRAMP at the first end of the ramp capacitor 435 can be represented in Equation 5 below:

$$V_{CSRAMP}(t) = \frac{R_a}{R_b}*V_{SW}+V_{OS} = \frac{R_a}{R_b}*i_L(t)*R_{on}+V_{OS} \text{ when } 0 \leq t \leq t_{off}. \quad \text{Equation 5}$$

In Equation 5, $R_a$ denotes a resistance value of the first resistor 455, $R_b$ denotes a resistance value of the second resistor 465, $V_{SW}$ denotes a voltage level of the switching node signal SW, $R_{on}$ is an on-resistance value of a low drive transistor (e.g., the low drive transistor 243 of FIG. 2), $V_{OS}$ denotes an offset voltage, and $t_{off}$ is a time at which the off-time duration ends.

During an on-time duration of the PWM signal PWM during which the PWM signal PWM has a logic high value, the drive low signal GL has a logic low value. The drive low signal GL having a logic low value operates to turn off the first, third, and fourth switching devices 423, 453, and 445. The PWM signal PWM having the logic high value turns on the fifth switching device 415. As a result, the adaptive current source 410 causes a current to flow through the fifth switching device 415 and to charge the ramp capacitor 435. The voltage level $V_{SCRAMP}$ of the CSR signal CSRAMP at the first end of the ramp capacitor 435 can be represented in Equation 6 below:

$$V_{CSRAMP}(t) = \frac{R_a}{R_b}*i_L(t_{off})*R_{on}+V_{OS}+ \\ \frac{V_{in}*G_{IN}*(t-t_{off})}{C_{ramp}} \text{ when } t_{off} \leq t \leq T_{SW}. \quad \text{Equation 6}$$

In Equation 6, $V_{in}$ denotes an input voltage (e.g., the input voltage $V_{in}$ of FIG. 2), $G_{IN}$ denotes an adaptive current gain of the adaptive current source 410, and $T_{SW}$ denotes a nominal switching period of a switching power supply (e.g., the switching power supply 201).

Figure 5:
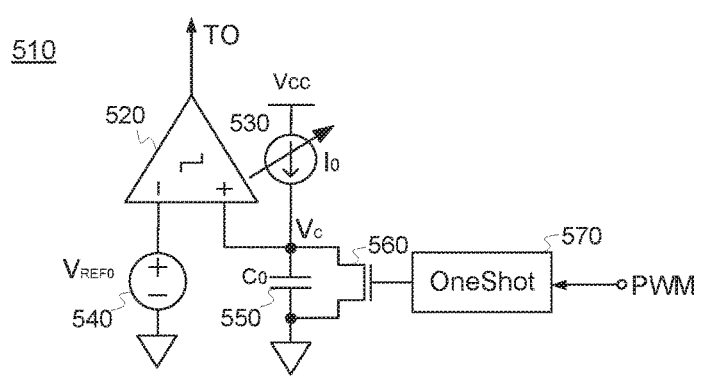
FIG. 5 illustrates a timer circuit according to an embodiment.

FIG. 5 illustrates a timer circuit 510 suitable for use as the timer circuit 210 of FIG. 2 according to an embodiment. The timer circuit 510 includes a one-shot pulse generator 570, a switching device 560, a capacitor 550, a current source 530, a reference voltage source 540, and a comparator 520.

The capacitor 550 has a first end connected to an output of the current source 530 and a positive terminal of the comparator 520. The capacitor 550 further has a second end connected to a ground.

The one-shot pulse generator 570 receives a PWM signal PWM (e.g., the PWM signal PWM of FIG. 2). At a rising edge of the PWM signal PWM, the one-shot pulse generator 570 generates a pulse signal having a logic high value to turn on the switching device 560. As a result, the switching device 560 pulls down a voltage level Vc at the first end of the capacitor 550 to zero, and then the comparator 520 outputs a timeout signal TO (e.g., the timeout signal TO of FIG. 2) having a logic low value.

Subsequently, the one-shot pulse generator 570 outputs a signal having a logic low value to turn off the switching device 560. As a result, the current source 530 causes a current to flow into the capacitor 550 to increase the voltage level Vc at the first end of the capacitor 550. The comparator 520 keeps outputting the timeout signal TO having the logic low value until the voltage level Vc becomes equal to or greater than a reference voltage $V_{REF0}$.

After a time corresponding to the rising edge of the PWM signal PWM, the timeout signal TO keeps having the logic low value during a timer interval $T_{timer}$. The timer interval $T_{timer}$ can be represented in Equation 7 below:

$$T_{timer} = \frac{C_0 * V_{REF0}}{I_0}. \qquad \text{Equation 7}$$

In Equation 7, $C_0$ denotes a capacitance value of the capacitor 550 and $I_0$ is a magnitude of the current flowing into the capacitor 550.

In an embodiment, the current source 530 is an adaptive current source, and generates a current having a magnitude $I_0$ that is proportional to a predetermined timer frequency $F_{timer}$. In this embodiment, the timer interval $T_{timer}$ can be represented in Equation 8 below:

$$T_{timer} = \frac{C_0 * V_{REF0}}{k_4 * F_{timer}}. \qquad \text{Equation 8}$$

In Equation 8, $k_4$ denotes a forth scaling factor, and the timer frequency $F_{timer}$ is the reciprocal of the timer interval $T_{timer}$. That is, the capacitance value $C_0$ of the capacitor 550 and the reference voltage $V_{REF0}$ satisfy Equation 9 below:

$$C_0 * V_{REF0} = k_4 \qquad \text{Equation 9.}$$

After the timer circuit 510 outputs the timeout signal TO having the logic low value during the timer interval $T_{timer}$, the voltage level Vc becomes equal to or greater than the reference voltage $V_{REF0}$. As a result, the timer circuit 510 outputs the timeout signal TO having the logic high value, and the timeout signal TO keeps having the logic high value until the PWM signal is asserted again.

Figure 6:
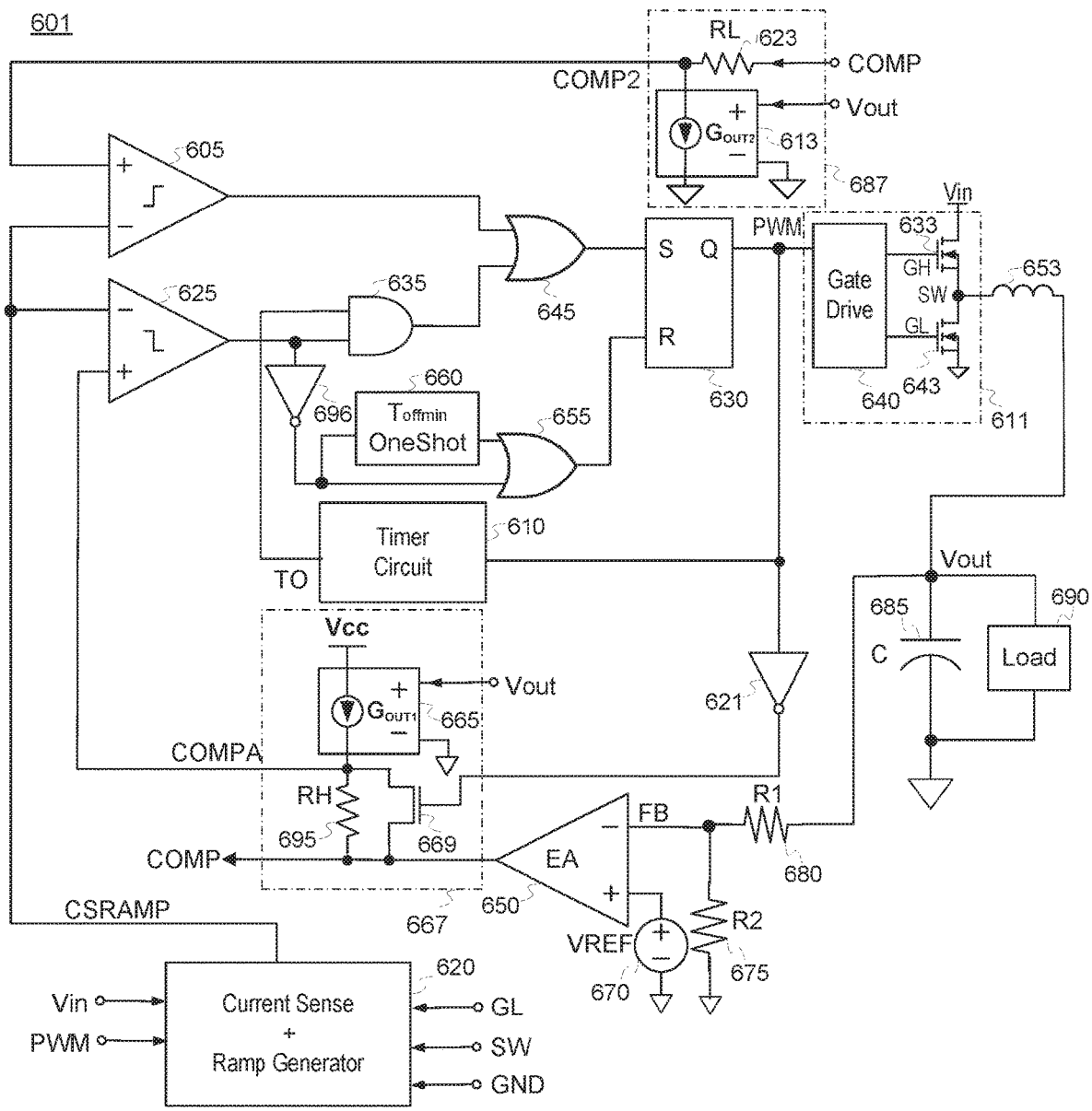
FIG. 6 illustrates a switching power supply suitable for use as the switching power regulator of FIG. 1, according to an embodiment.

FIG. 6 illustrates a switching power supply 601 suitable for use as the switching power regulator 101 of FIG. 1 according to an embodiment. The switching power supply 601 of FIG. 6 differs from the switching power supply 201 of FIG. 2 in that, in FIG. 6, the switching power supply 601 includes two comparators 605 and 625, rather than three comparators 205, 215, and 225 of the switching power supply 201. The switching power supply 601 further includes first and second inverters 621 and 696, and a switching device 669. Elements designated by references characters of the form "6xx" in FIG. 6 correspond to like-numbered elements of the form "2xx" in FIG. 2; for example, the element designated by reference character 687 in FIG. 6 corresponds to the second threshold signal generator 287 in FIG. 2.

When the PWM signal PWM has a logic low value, the first inverter 621 outputs a signal having a logic high value to turn on the switching device 669. As a result, a first threshold signal COMPA serves as the comparison signal COMP of FIG. 2, and the second comparator 625 functions similarly to the second comparator 215 of FIG. 2.

When the PWM signal PWM has a logic high value, the first inverter 621 outputs the signal having a logic low value to turn off the switching device 669. As a result, a first threshold signal COMPA serves as the first threshold signal COMP1 of FIG. 2, and the second comparator 625 and the second inverter 696 function similarly to the third comparator 225 of FIG. 2.

Other operations of the switching power supply 601 are similar to those of the switching power supply 201 of FIG. 2. Accordingly, detailed descriptions of these operations of the signal generator 601 will be omitted herein for the interest of brevity.

Figure 7:
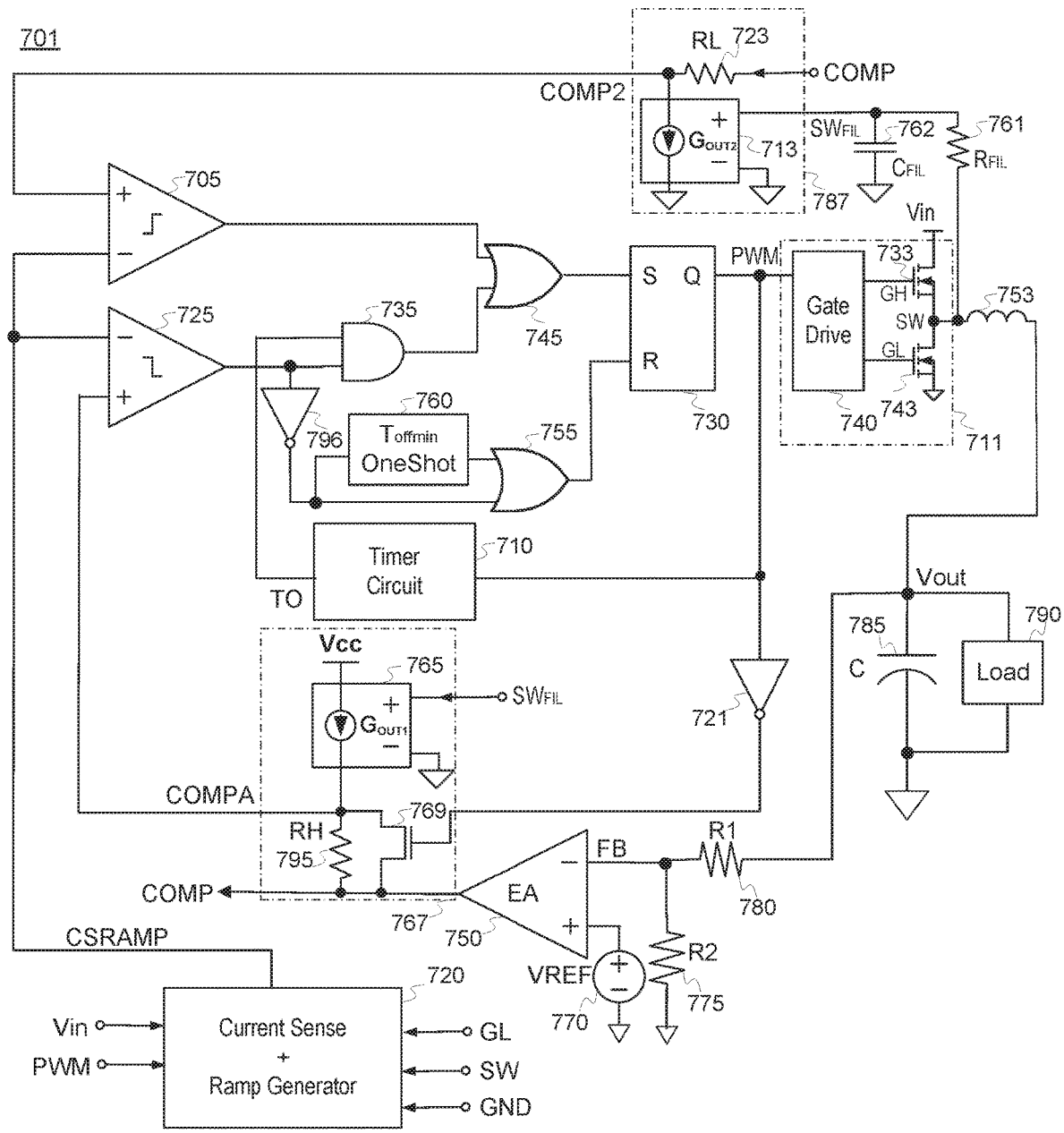
FIG. 7 illustrates a switching power supply suitable for use as the switching power regulator of FIG. 1, according to an embodiment.

FIG. 7 illustrates a switching power supply 701 suitable for use as the switching power regulator 101 of FIG. 1 according to an embodiment. The switching power supply 701 of FIG. 7 differs from the switching power supply 601 of FIG. 6 in that, in FIG. 7, the switching power supply 701 includes a low-pass filter. Elements designated by references characters of the form "7xx" in FIG. 7 correspond to like-numbered elements of the form "6xx" in FIG. 6; for example, the element designated by reference character 787 in FIG. 7 corresponds to the second threshold signal generator 687 in FIG. 6.

The low-pass filter includes a filter capacitor 762 and a filter resistor 761, and generates a filtered version $SW_{FIL}$ of a switching node signal SW. In an embodiment, a time constant of the low-pass filter is equal to or greater than 5 times of a nominal switching period of the switching power supply 601.

The filtered version $SW_{FIL}$ of the switching node signal SW has a DC level substantially equal to a DC level of an output voltage Vout. First and second threshold signal generators 767 and 787 generate first and second threshold signals COMPA and COMP2, respectively, based on the filtered version $SW_{FIL}$ of a switching node signal SW, rather than the output voltage Vout. Accordingly, when the switching power supply 701 includes a pin (not shown) receiving a signal indicative of the switching node signal SW, another pin (not shown) receiving a signal indicative of the output voltage Vout may be omitted in the switching power supply 701.

Other operations of the switching power supply 701 are similar to those of the switching power supply 601 of FIG. 6. Therefore, detailed descriptions of these operations of the signal generator 701 will be omitted herein for the interest of brevity.

Figure 8:
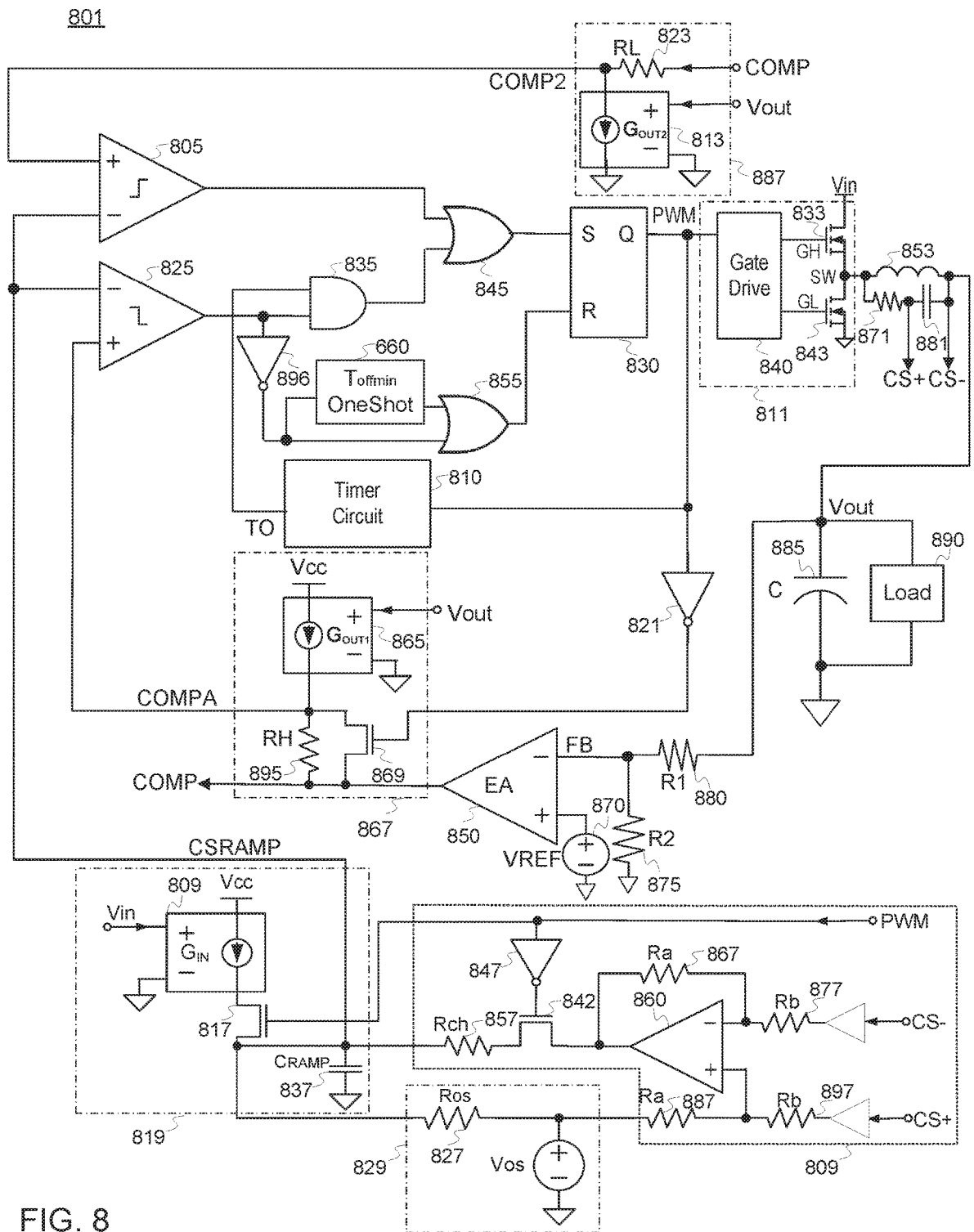
FIG. 8 illustrates a switching power supply suitable for use as the switching power regulator of FIG. 1, according to an embodiment.

FIG. 8 illustrates a switching power supply 801 suitable for use as the switching power regulator 101 of FIG. 1 according to an embodiment. The switching power supply 801 of FIG. 8 differs from the switching power supply 601 of FIG. 6 in that, in FIG. 8, the switching power supply 801 includes an inductor current sensor and a current sense circuit 809 operates in response to first and second current sense signals CS+ and CS−, rather than a switching node signal SW. Elements designated by references characters of the form "8xx" in FIG. 8 correspond to like-numbered elements of the form "6xx" in FIG. 6; for example, the element designated by reference character 887 in FIG. 8 corresponds to the second threshold signal generator 687 in FIG. 6.

The inductor current sensor includes a sense resistor 871 and a sense capacitor 881. The sense resistor 871 has a first end connected to a first end of an output inductor 853 and a second end outputting the first current sense signal CS+. The sense capacitor 881 has a first end connected to the second end of the sense resistor 871 and a second end outputting the second current sense signal CS−. The second end of the sense capacitor 881 is connected to a second end of the output inductor 853.

A voltage across the sense capacitor 881, which corresponds to a difference between the first and second sense signals CS+ and CS−, can be represented in Equation 10 below:

$$V_{CS} = \frac{(R_L + sL) * i_L}{(1 + s*R_f*C_f)} = R_L * \frac{(1+sT)}{(1+sT_1)} * i_L.$$ Equation 10

In Equation 10, $V_{CS}$ denotes the voltage across the sense capacitor 881, $R_L$ denotes a DC resistance value of the output inductor 853, L denotes an inductance value of the output inductor 853, $R_f$ denotes a resistance value of the sense resistor 871, $C_f$ denotes a capacitance value of the sense capacitor 881, $i_L$ denotes a magnitude of an inductor current, T is equal to $L/R_L$, and $T_1$ is equal to $R_f*C_f$. When T is substantially equal to $T_1$, the voltage $V_{CS}$ across the sense capacitor 881 is proportional to the magnitude $i_L$ of the inductor current, and thus the inductor current sensor including the sense capacitor 881 can generate the first and second current sense signals CS+ and CS− indicative of the magnitude $i_L$ of the inductor current.

The current sense circuit 809 includes an inverter 847, a switching device 842, first, second, third, fourth, and fifth resistors 867, 877, 887, 897, and 857, and an amplifier 860. During an off-time duration of a PWM signal PWM, the current sense circuit 809 receives the first and second current sense signals CS+ and CS− and amplifies the difference between the first and second current sense signals CS+ and CS− to provide the amplified signal to a first end of a ramp capacitor 837.

Other operations of the switching power supply 801 are similar to those of the switching power supply 601 of FIG. 6. Therefore, detailed descriptions of these operations of the signal generator 801 will be omitted herein for the interest of brevity.

Figure 9:
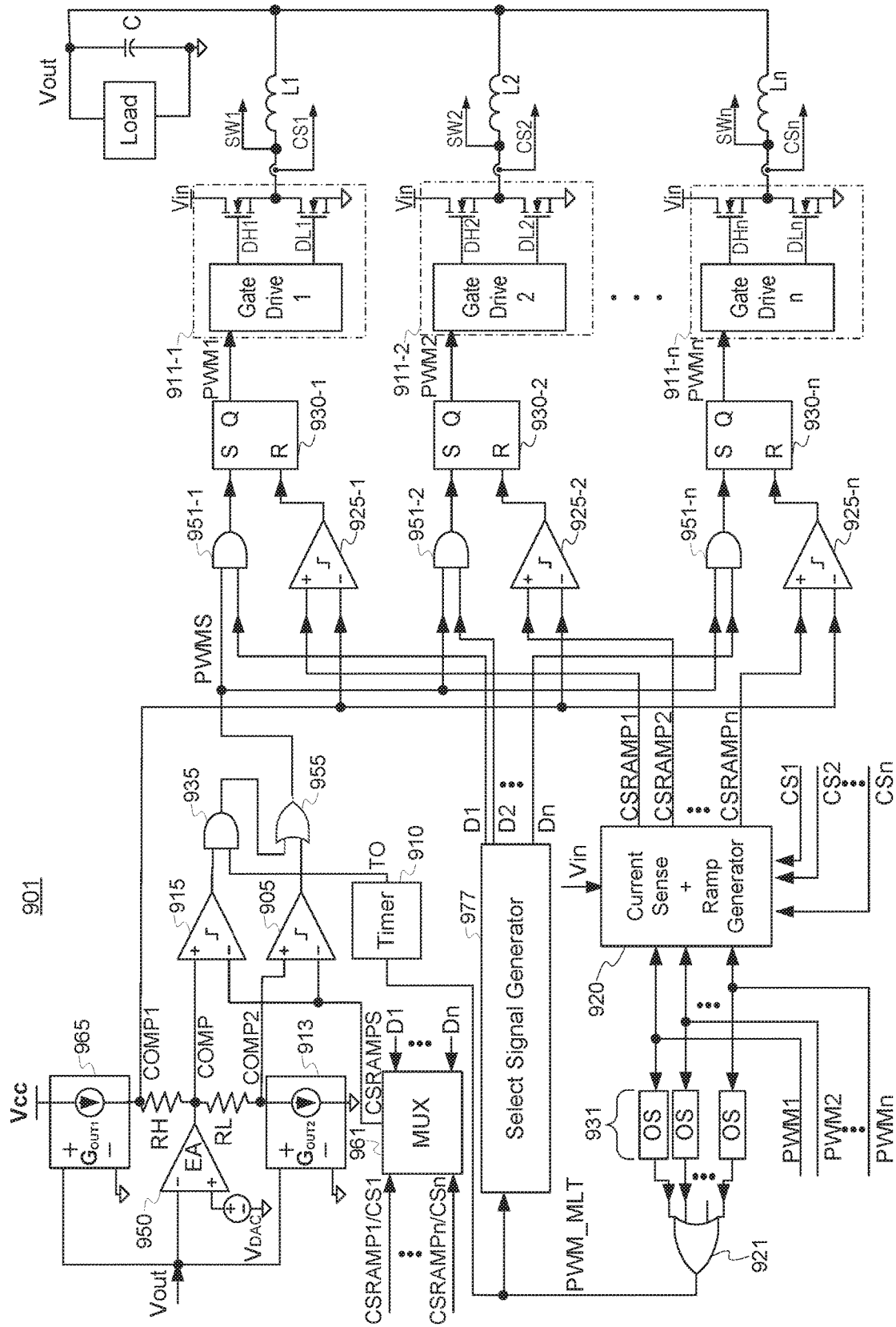
FIG. 9 illustrates a switching power supply suitable for use as the switching power regulator of FIG. 1, according to an embodiment.

FIG. 9 illustrates a switching power supply 901 suitable for use as the switching power regulator 101 of FIG. 1 according to an embodiment. The switching power supply 901 is a multi-phase power supply, which includes a plurality of RS flip-flops 930-1 to 930-n, a plurality of driver and switch circuits 911-1 to 911-n, a first comparator 905, a second comparator 915, a plurality of third comparators 925-1 to 925-n, and a plurality of inductors L1 to Ln. The switching power supply 901 further includes an Error Amplifier (EA) 950, a timer circuit 910, a multiplexer (MUX) 961, a plurality of one-shot (OS) circuits 931, an OR gate 921, a CSR signal generator 920, and a select signal generator 977.

The select signal generator 977 receives a pulse signal PWM_MLT and generates first to $n^{th}$ phase select signals D1 to Dn. During an initialization, the select signal generator 977 sets the first phase select signal D1 to an active state (e.g. a high state) and sets the second to $n^{th}$ phase select signal D2 to Dn to an inactive state (e.g. a low state), indicating that the first phase is a selected phase. Subsequently, when an $i^{th}$ phase select signal Di has the active state, i is less than a number of phases n, and a pulse is received on the pulse signal PWM_MLT, the select signal generator 977 sets the $i^{th}$ phase select signal Di to the inactive state and sets the $(i+1)^{th}$ phase select signal Di+1 to the active state. When the $n^{th}$ phase select signal Dn has the active state, and a pulse is received on the pulse signal PWM_MLT, the select signal generator 977 sets the $n^{th}$ phase select signal Dn to the inactive state and the first phase select signal D1 to the active state.

Accordingly, the select signal generator 977 sets only one of the first to $n^{th}$ phase select signals D1 to Dn to the active state (i.e., as the active phase) at any time. The select signal generator 977 steps through the first to $n^{th}$ phase select signals D1 to Dn setting each to the active state (i.e., as the active phase) in turn when a pulse is received on the pulse signal PWM_MLT.

The plurality of one-shot (OS) circuits 931 respectively receive first to $n^{th}$ PWM signals PWM1 to PWMn and respectively generate a pulse in response to positive edges of the first to $n^{th}$ PWM signals PWM1 to PWMn. In an embodiment, the pulse has a high value (e.g., a logic high value).

The OR gate 921 receives the output signals of the plurality of OS circuits 931 and generates the pulse signal PWM_MLT having a value equal to a logical OR of the values of the outputs of the plurality of OS circuits 931. As a result, whenever any of the plurality of OS circuits 931 generates a pulse having a high value on its output signal, the OR gate 921 generates a pulse having a high value on the pulse signal PWM_MLT.

The CSR signal generator 920 receives first to $n^{th}$ current sense (CS) signals CS1 to CSn, the first to $n^{th}$ PWM signals PWM1 to PWMn, and an input voltage Vin. First to $n^{th}$ current sensors generate the first to $n^{th}$ CS signals CS1 to CSn, respectively. The CSR signal generator 920 generates first to $n^{th}$ CSR signals CSRAMP1 to CSRAMPn according to the received signals. In an embodiment, the CSR signal generator 920 includes first to $n^{th}$ sub-CSR signal generators respectively generating the first to $n^{th}$ CSR signals CSRAMP1 to CSRAMPn. An operation of such a sub-CSR signal generator will be described below in more detail with reference to FIG. 10.

Figure 10:
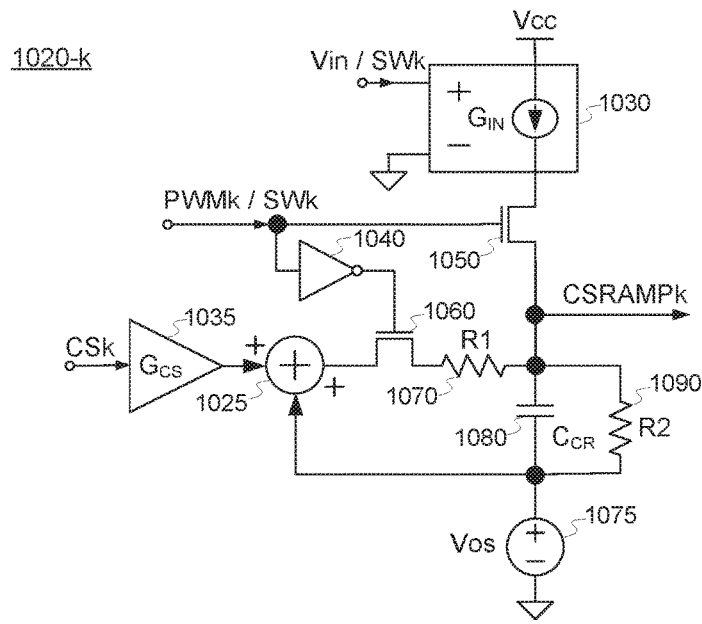
FIG. 10 illustrates a $k^{th}$ sub-CSR signal generator suitable for use as a sub-CSR signal generator included in a CSR signal generator of FIG. 9, according to an embodiment.

FIG. 10 illustrates a $k^{th}$ sub-CSR signal generator 1020-k suitable for use as a sub-CSR signal generator included in the CSR signal generator 920 of FIG. 9 according to an embodiment. The $k^{th}$ sub-SCR signal generator 1020-k includes an adaptive current source 1030, first and second switching devices 1050 and 1060, an inverter 1040, a buffer 1035, an adder 1025, first and second resistors 1070 and 1090, a ramp capacitor 1080, and an offset voltage source 1075.

During an off-time duration of a $k^{th}$ PWM signal PWMk, the first switching device 1050 is turned off and the second switching device 1060 is turned on. As a result, voltage level $V_{CSRAMPk}$ of a $k^{th}$ CSR signal CSRAMPk at a first end of the ramp capacitor 1080 can be represented in Equation 11 below:

$$V_{CSRAMPk}(t) =$$ Equation 11

$$\frac{R_2}{R_1 + R_2} * CSk(t) * G_{CS} + V_{OS} \text{ when } 0 \le t \le t_{\mathit{off}}.$$

In Equation 11, $R_1$ denotes a resistance value of the first resistor 1070, $R_2$ denotes a resistance value of the second resistor 1090, $G_{CS}$ is a gain of the buffer 1035, $V_{OS}$ denotes an offset voltage, and $t_{\mathit{off}}$ is a time at which an off-time duration of the $k^{th}$ PWM signal PWMk ends.

During an on-time duration of the $k^{th}$ PWM signal PWMk, the second switching device 1060 is turned off and the first switching device 1050 is turned on. As a result, the adaptive current source 1030 causes a current to flow through the first switching device 1050, which charges the ramp capacitor 1080. The voltage level $V_{CSRAMPk}$ of the $k^{th}$ CSR signal CSRAMPk at the first end of the ramp capacitor 1080 can be represented in Equation 12 below:

$$V_{CSRAMP}(t) = \frac{R_2}{R_1 + R_2} * CSk(t_{\mathit{off}}) * G_{CS} +$$ Equation 12

$$V_{OS} + \frac{V_{in} * G_{IN} * (t - t_{\mathit{off}})}{C_{CR}} \text{ when } t_{\mathit{off}} \le t \le T_{SWk}.$$

In Equation 12, $V_{in}$ denotes an input voltage, $G_{IN}$ denotes an adaptive current gain of the adaptive current source 1030, $C_{CR}$ denotes a capacitance value of the ramp capacitor 1080, and $T_{SWk}$ denotes a nominal switching period.

In the above-described embodiment, the $k^{th}$ sub-CSR signal generator 1020-$k$ generates the $k^{th}$ CSR signal CSRAMPk according to the input voltage Vin and the $k^{th}$ PWM signal PWMk. However, embodiments of the present disclosure are not limited thereto. In another embodiment, the $k^{th}$ sub-CSR signal generator 1020-$k$ generates the $k^{th}$ CSR signal CSRAMPk according to a $k^{th}$ switching node signal SWk, rather than input voltage Vin and the $k^{th}$ PWM signal PWMk. In such an embodiment, a voltage level of the $k^{th}$ switching node signal SWk during the on-time duration of the $k^{th}$ PWM signal PWMk has a substantially equal level to the input voltage Vin. In some embodiments, the $k^{th}$ switching node signal SWk may take place of the $k^{th}$ PWM signal PWMk, neglecting a delay time from the $k^{th}$ PWM signal PWMk to the $k^{th}$ switching node signal SWk.

In an embodiment, the second resistor 1090 has the resistance value $R_2$ sufficiently great to provide a bias voltage for the $k^{th}$ CSR signal CSRAMPk, when the switching power supply performs a pulse skipping operation. In such an embodiment, the resistance value $R_2$ of the second resistor 1090 is greater than the resistance value $R_1$ the first resistor 1070.

Figure 11:
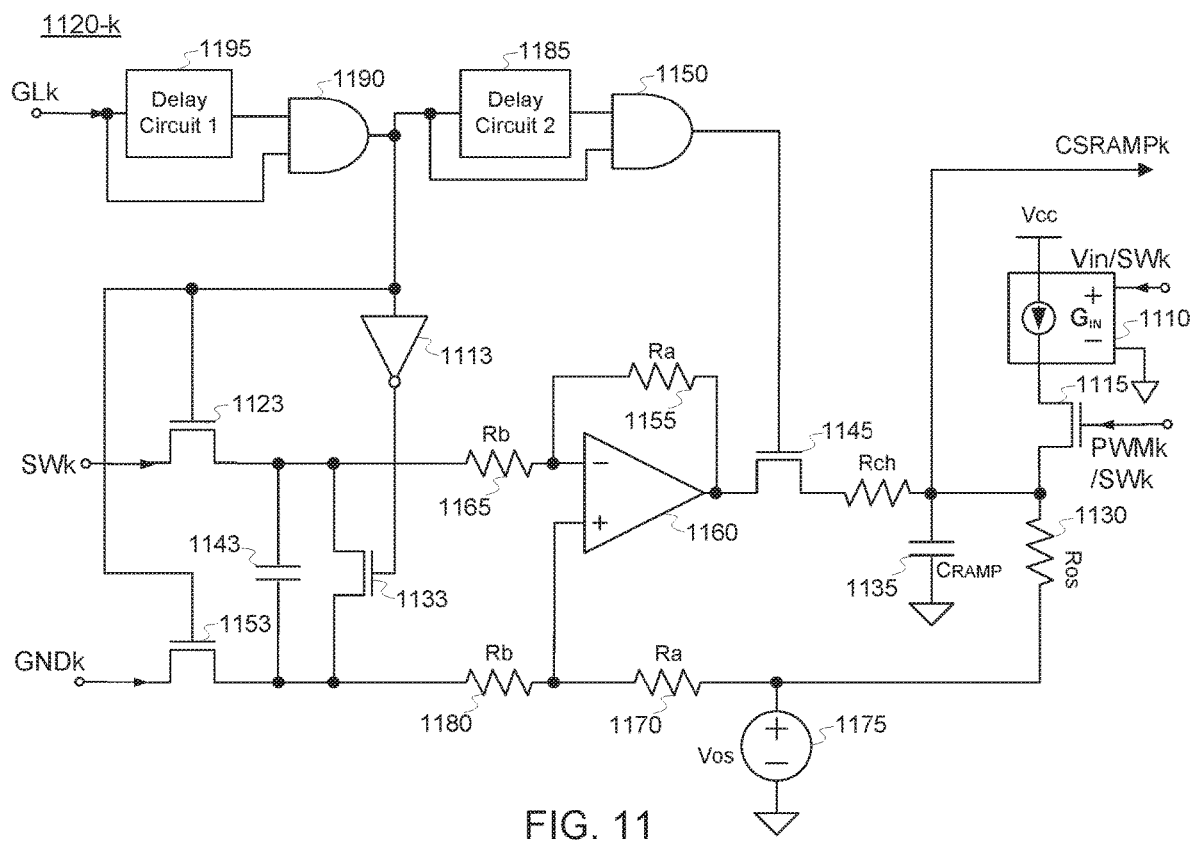
FIG. 11 illustrates a $k^{th}$ sub-CSR signal generator suitable for use as a sub-CSR signal generator included in the CSR signal generator of FIG. 9, according to another embodiment.

FIG. 11 illustrates a $k^{th}$ sub-SCR signal generator 1120-$k$ suitable for use as a sub-CSR signal generator included in the CSR signal generator 920 of FIG. 9 according to another embodiment.

The $k^{th}$ sub-SCR signal generator 1120-$k$ has substantially the same configuration as the CSR signal generator 420 of FIG. 4. Elements designated by references characters of the form "11xx" in FIG. 11 correspond to like-numbered elements of the form "4xx" in FIG. 4; for example, the element designated by reference character 1160 in FIG. 11 corresponds to the amplifier 460 in FIG. 4. An operation of the $k^{th}$ sub-SCR signal generator 1120-$k$ is similar to that of the CSR signal generator 420 of FIG. 4. Therefore, detailed descriptions of the operation of the $k^{th}$ sub-SCR signal generator 1120-$k$ will be omitted herein for the interest of brevity.

Referring back to FIG. 9, the timer circuit 910 receives the pulse signal PWM_MLT and outputs a timeout signal TO in response to the pulse signal PWM_MLT. For example, the timer circuit 910 starts to output the timeout signal TO having a logic low value from a specific time corresponding to a rising edge of the pulse signal PWM_MLT and keeps outputting the timeout signal TO during a time interval $T_{SW}/n$ equal to the nominal switching period $T_{SW}$ divided by a phase number n. Subsequently, the timer circuit 910 starts to output the timeout signal TO having a logic high value. An operation of the timer circuit 910 will be described below in more detail with reference to FIG. 12.

Figure 12:
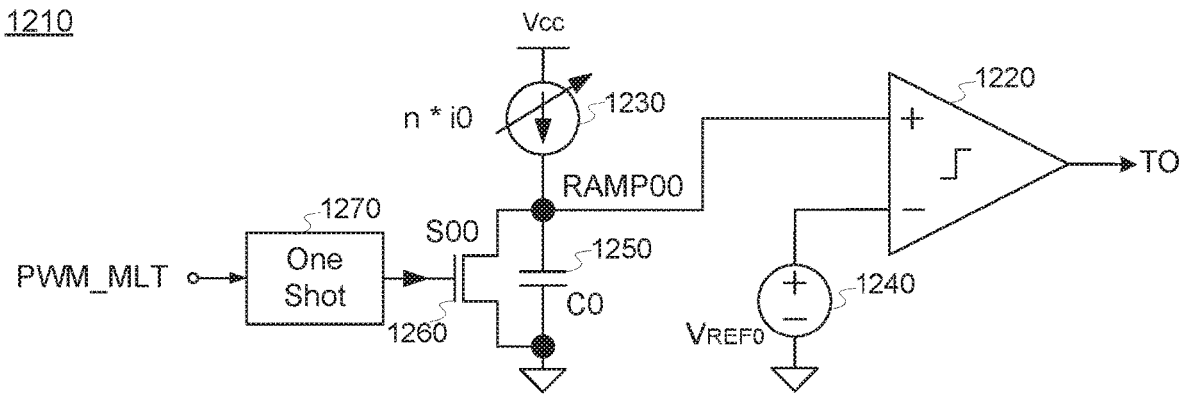
FIG. 12 illustrates a timer circuit suitable for use as a timer circuit of FIG. 9, according to an embodiment.

FIG. 12 illustrates a timer circuit 1210 suitable for use as the timer circuit 910 of FIG. 9. The timer circuit 1210 of FIG. 12 differs from the timer circuit 510 of FIG. 5 in that, in FIG. 9, a magnitude of a current flowing into a capacitor 1250 is n times as great as the magnitude $I_0$ of the current flowing into the capacitor 550 of FIG. 5. As a result, the timeout signal TO is asserted at a time equal to the sum of the specific time corresponding to the rising edge of the pulse signal PWM_MLT and the time interval $T_{SW}/n$.

Other operations of the timer circuit 1210 are similar to those of the timer circuit 510 of FIG. 5. Elements designated by references characters of the form "12xx" in FIG. 12 correspond to like-numbered elements of the form "5xx" in FIG. 5; for example, the element designated by reference character 1220 in FIG. 12 corresponds to the comparator 520 in FIG. 5. Therefore, detailed descriptions of the operation of the timer circuit 1210 will be omitted herein for the interest of brevity.

Referring back again to FIG. 9, the MUX 961 receives the first to $n^{th}$ CSR signals CSRAMP1 to CSRAMPn or the first to $n^{th}$ CS signals CS1 to CSn. The MUX 961 selects one of the received signals in response to the first to $n^{th}$ phase select signals D1 to Dn, and outputs the selected one as a selected CSR signal CSRAMPS to the second comparator 915. An operation of the MUX 961 will be described below in more detail with reference to FIG. 13.

Figure 13:
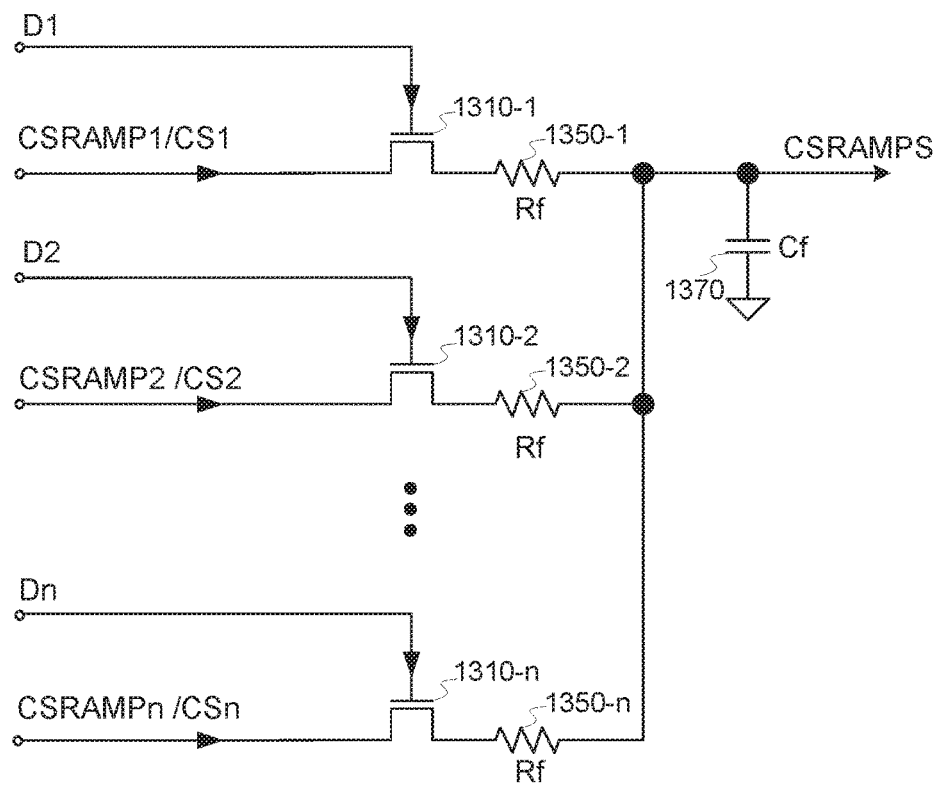
FIG. 13 illustrates a multiplexer (MUX) suitable for use as a MUX of FIG. 9, according to an embodiment.

FIG. 13 illustrates a MUX 1361 suitable for use as the MUX 961 of FIG. 9 according to an embodiment. The MUX 1361 includes first to $n^{th}$ switching devices 1310-1 to 1310-$n$, first to $n^{th}$ resistors 1350-1 to 1350-$n$, and a capacitor 1370.

When an $i^{th}$ phase select signal Di is in an active state, the remaining phase select signals D1 to Di−1 and Di+1 to Dn are in an inactive state. As a result, an $i^{th}$ switching device 1310-$i$ is turned on to output an $i^{th}$ CSR signal CSRAMPi or an $i^{th}$ CS signal CSi as the selected CSR signal CSRAMPS. An $i^{th}$ resistor 1350-$i$ and the capacitor 1370 function as a filter having a time constant that is less than a nominal switching period of a switching power supply (e.g., the switching power supply 901 of FIG. 9).

Figure 14:
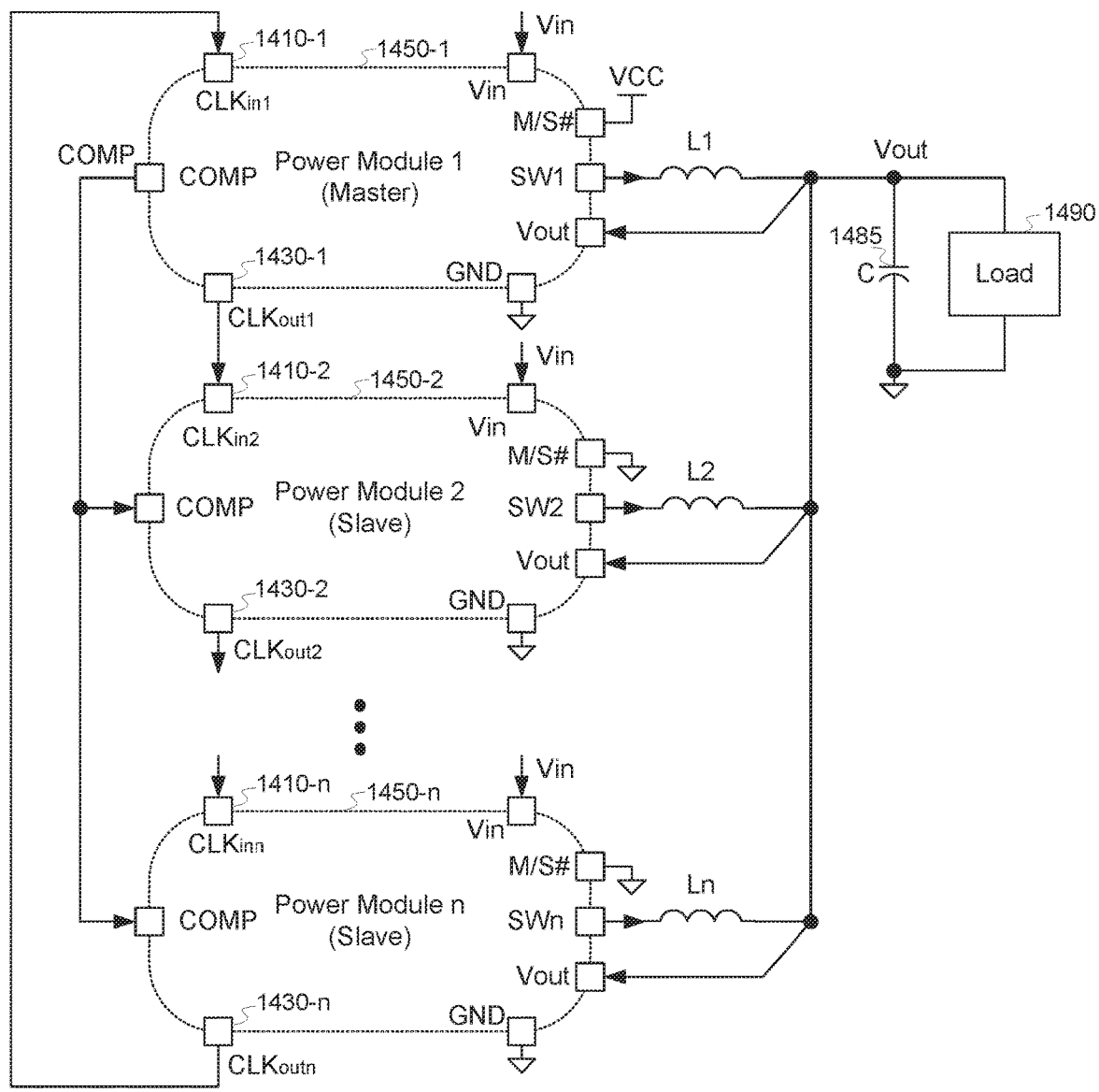
FIG. 14 illustrates a switching power supply suitable for use as the switching power regulator of FIG. 1, according to an embodiment.

FIG. 14 illustrates a switching power supply 1401 suitable for use as the switching power regulator 101 of FIG. 1, according to an embodiment. The switching power supply 1401 is a multi-phase power supply, which includes a plurality of power modules 1450-1 to 1450-$n$, a plurality of inductors L1 to Ln, an output capacitor 1485, and a load 1490.

Each of the plurality of power modules 1450-1 to 1450-$n$ includes a controller to generate a current flowing through a corresponding one of the plurality of inductors L1 to Ln. The plurality of power modules 1450-1 to 1450-$n$ have substantially the same configuration, facilitating a scalable chip configuration of the multiphase switching power supply 1401.

The plurality of power modules 1450-1 to 1450-n are coupled to each other in a daisy chain. For example, an $i^{th}$ power modules 1450-i has an output clock port 1430-i connected to an input clock port 1410-i+1 of an $i+1^{th}$ power module 1450-i+1 when i denotes a natural number less than a phase number n, and an $n^{th}$ power modules 1450-n has an output clock port 1430-n connected to an input clock port 1410-1 of a first power module 1450-1.

One (e.g., the first power module 1450-1) of the plurality of power modules 1450-1 to 1450-n, which functions as a master module, detects an output voltage Vout and generates a comparison signal COMP in response to the output voltage Vout and a reference voltage. The first power module 1450-1 provides the comparison signal COMP to the remaining power modules (e.g., second to $n^{th}$ power modules 1450-2 to 1450-n), which respectively function as slave modules. The first power module 1450-1 further generates a first output clock signal $CLK_{out1}$ in response to a first PWM signal, and outputs the first output clock signal $CKL_{out1}$ through an output clock port 1430-1 to an input clock port 1410-2 of the second power module 1450-2. After receiving the first output clock signal $CKL_{out1}$ as a second input clock signal $CKL_{in2}$, the second power module 1450-2 keeps outputting a second PWM signal having a logic low value during a time interval $T_{SW}/n$ equal a nominal switching period $T_{SW}$ divided by a phase number n. Subsequently, the second power module 1450-2 starts to output the second PWM signal having a logic high value, and generates a second output clock signal $CKL_{out2}$ in response to the second PWM signal. The second power module 1450-2 further outputs the second output clock signal $CKL_{out2}$ through an output clock port 1430-2 to an input clock port 1410-3 of a third power module 1450-3. When the $n^{th}$ power module 1450-n generates an $n^{th}$ output clock signal $CKL_{outn}$ in response to an $n^{th}$ PWM signal, the $n^{th}$ power module 1450-n outputs the $n^{th}$ output clock signal $CKL_{outn}$ through an output clock port 1430-n to an input clock port 1410-1 of the first power module 1450-1.

Figure 15:
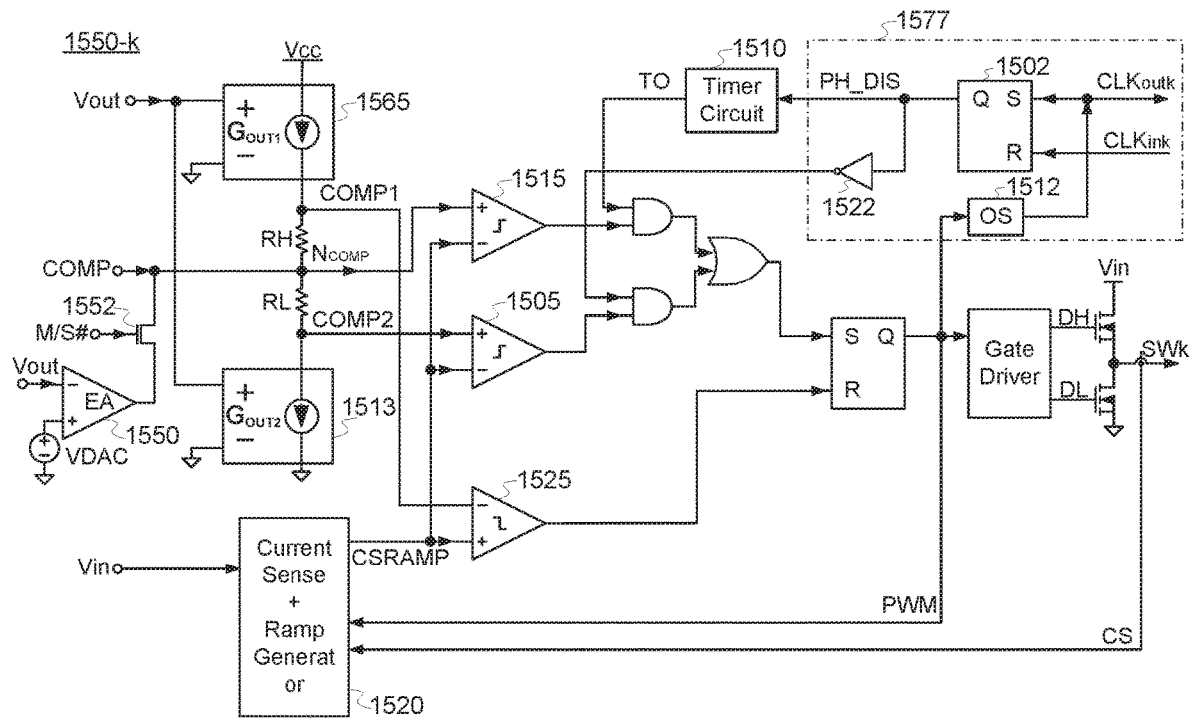
FIG. 15 illustrates a $k^{th}$ power module suitable for use as one of a plurality of power modules of FIG. 14, according to an embodiment.

FIG. 15 illustrates a $k^{th}$ power module 1550-k suitable for use as one of the plurality of power modules 1450-1 to 1450-n of FIG. 14, according to an embodiment. The $k^{th}$ power module 1550-k of FIG. 15 differs from the switching power supply 201 of FIG. 2 in that, in FIG. 15, the $k^{th}$ power module 1550-k includes a select switching device 1552 and a disable signal generator 1577.

The select switching device 1552 receives a master select signal M/S # and couples an error amplifier 1550 to a node $N_{COMP}$ receiving a comparison signal COMP in response to the master select signal M/S #. In an embodiment, when the master select signal M/S # has a logic high value, the select switching device 1552 is turned on to couple an output of the error amplifier 1550 to the node $N_{COMP}$, and the $k^{th}$ power module 1550-k functions as a master module. In such an embodiment, when the master select signal M/S # has a logic low value, the select switching device 1552 is turned off, and the $k^{th}$ power module 1550-k functions as a slave module.

The disable signal generator 1577 includes an RS flip-flop 1502, an inverter 1522, and a one-shot (OS) pulse generator 1512. Before the $k^{th}$ power module 1550-k receives a $k-1^{th}$ output clock signal from a $k-1^{th}$ power module 1550-k-1 as a $k^{th}$ input clock signal $CLK_{ink}$, the RS flip-flop 1502 outputs a disable signal PH_DIS having a logic high value. A timer circuit 1510 outputs a timeout signal TO having a low logic value in response to the disable signal PH_DIS having the logic high value. When the $k^{th}$ power module 1550-k receives the $k-1^{th}$ output clock signal from the $k-1^{th}$ power module 1550-k-1 as the $k^{th}$ input clock signal $CLK_{ink}$, the RS flip-flop 1502 outputs the disable signal PH_DIS having a logic low value. The timer circuit 1510 keeps outputting the timeout signal TO having the low logic value in response to the disable signal PH_DIS having the logic low value during the time interval $T_{SW}/n$, and then outputs the timeout signal TO having a logic high value.

When a PWM signal PWM is asserted, the OS pulse generator 1512 outputs a pulse signal as an $k^{th}$ output clock signal $CLK_{outk}$ in response to the PWM signal PWM. A $k+1^{th}$ power module (not shown) receives the $k^{th}$ output clock signal $CLK_{outk}$ as a $k+1^{th}$ input clock signal, which resets a RS flip-flop (not shown) in the $k+1^{th}$ power module.

Other operations of the $k^{th}$ power module 1550-k of FIG. 15 are similar to those of the switching power supply 201 of FIG. 2. Therefore, detailed descriptions of these operation of the $k^{th}$ power module 1550-k will be omitted herein for the interest of brevity.

Figure 16:
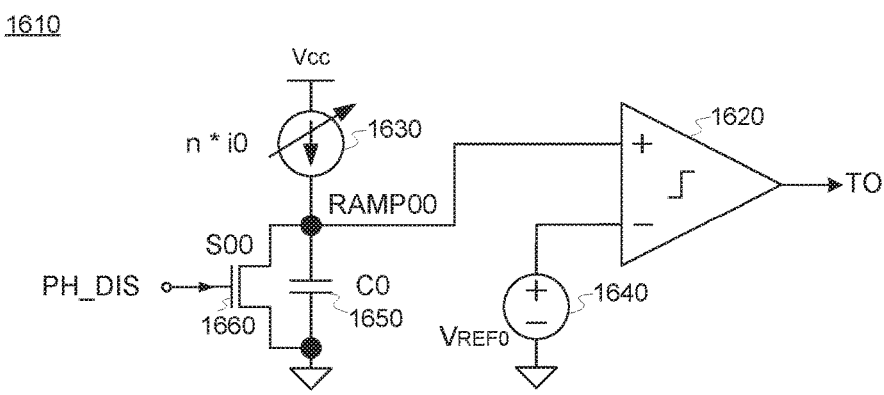
FIG. 16 illustrates a timer circuit suitable for use as a timer circuit of FIG. 15, according to an embodiment.

FIG. 16 illustrates a timer circuit 1610 suitable for use as the timer circuit 1510 of FIG. 15, according to an embodiment. The timer circuit 1610 of FIG. 16 differs from the timer circuit 1210 of FIG. 2 in that, in FIG. 16, the timer circuit 1610 receives a disable signal PH_DIS (e.g., the disable signal PH_DIS of FIG. 15) from a flip-flop (e.g., the RS flip-flop 1502 of FIG. 15), not a pulse signal from the OS pulse generator 1270 of FIG. 12.

When the disable signal PH_DIS has a logic high value, a comparator 1620 outputs a timeout signal TO having a logic low value. When the flip-flop is reset to output the disable signal PH_DIS having a logic low value at a specific time, a timeout signal TO is asserted at a time equal to the sum of the specific time corresponding to a falling edge of the disable signal PH_DIS and a time interval $T_{SW}/n$.

Other operations of the timer circuit 1610 are similar to those of the timer circuit 1210 of FIG. 12. Elements designated by references characters of the form "16xx" in FIG. 16 correspond to like-numbered elements of the form "12xx" in FIG. 12; for example, the element designated by reference character 1620 in FIG. 12 corresponds to the comparator 1220 in FIG. 12. Therefore, detailed descriptions of these operations of the timer circuit 1610 will be omitted herein for the interest of brevity.

Figure 17:
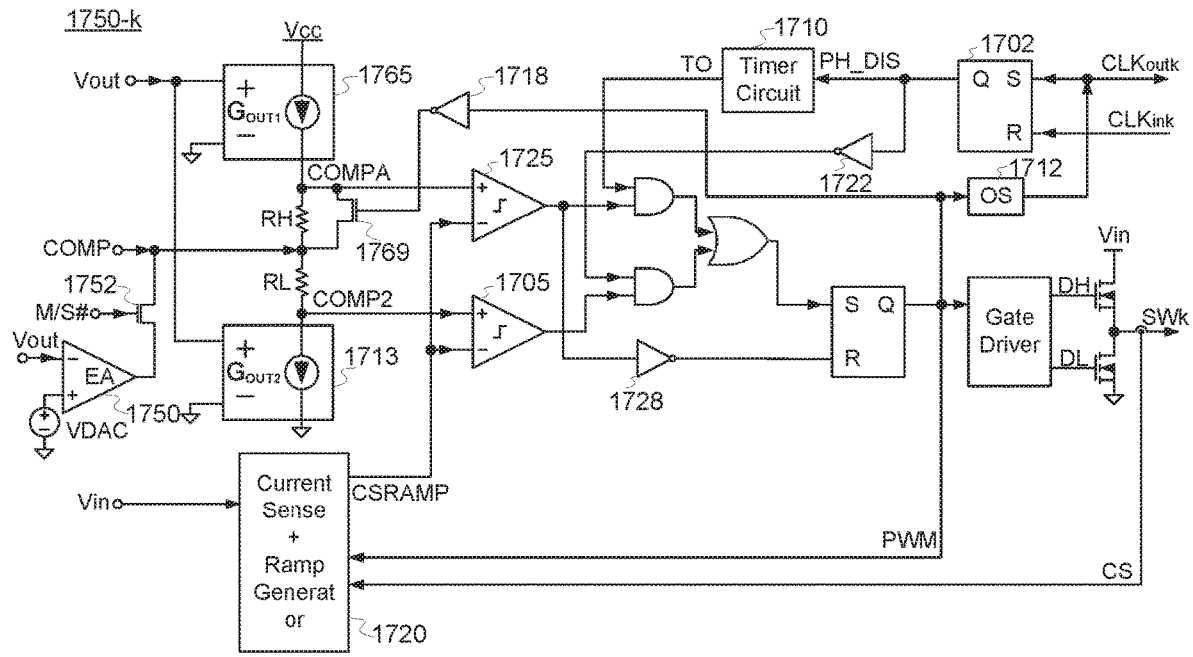
FIG. 17 illustrates a $k^{th}$ power module suitable for use as one of the plurality of power modules of FIG. 14, according to another embodiment.

FIG. 17 illustrates a $k^{th}$ power module 1750-k suitable for use as one of the plurality of power modules 1450-1 to 1450-n of FIG. 14, according to another embodiment. The $k^{th}$ power module 1750-k of FIG. 17 differs from the $k^{th}$ power module 1550-k of FIG. 15 in that, in FIG. 17, the $k^{th}$ power module 1750-k includes two comparators 1705 and 1725, rather than three comparators 1505, 1515, and 1525 of the $k^{th}$ power module 1550-k of FIG. 15. The $k^{th}$ power module 1750-k of FIG. 17 also includes first and second inverters 1718 and 1728, and a switching device 1769.

When a PWM signal PWM has a logic low value, the first inverter 1718 outputs a signal indicative of a logic high value to turn on the switching device 1769. As a result, a first threshold signal COMPA serves as the comparison signal COMP of FIG. 15. When the PWM signal PWM has a logic high value, the first inverter 1718 outputs the signal indicative of a logic low value to turn off the switching device 1769. As a result, the first threshold signal COMPA serves as the first threshold signal COMP1 of FIG. 15.

Other operations of the $k^{th}$ power module 1750-k are similar to those of the $k^{th}$ power module 1550-k of FIG. 15. Elements designated by references characters of the form "17xx" in FIG. 17 correspond to like-numbered elements of the form "15xx" in FIG. 15; for example, the element designated by reference character 1710 in FIG. 17 corresponds to the timer circuit 1510 in FIG. 15. Therefore, detailed descriptions of these operation of the $k^{th}$ power module 1750-$k$ will be omitted herein for the interest of brevity.

Figure 18:
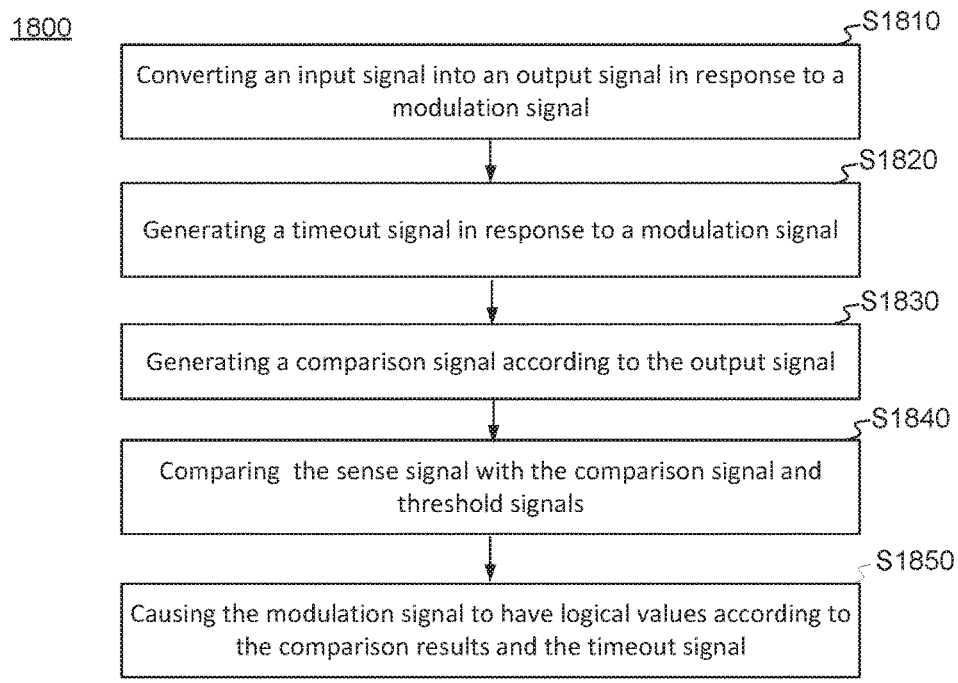
FIG. 18 a flowchart that illustrates a process performed by a switching power supply, according to an embodiment.

FIG. 18 is a flowchart that illustrates a process 1800 performed by a switching power supply (e.g., the switching power supply 201 of FIG. 2) according to an embodiment. The switching power supply includes a power converter, a timer circuit, and a controller.

At S1810, the power converter converts an input signal into an output signal response to a modulation signal. At S1820, the timer circuit generates a timeout signal in response to the modulation signal.

At S1830, the controller generates a comparison signal according to the output signal. In an embodiment, the controller includes an EA and the EA receives a feedback voltage and a reference voltage and generates the comparison signal according to the feedback voltage and the reference voltage.

At S1840, the controller compares a sense signal with the comparison signal, a first threshold signal, and a second threshold signal. In an embodiment, the first threshold signal has a value equal to a sum of a value of the comparison signal and a first threshold value, the first threshold value being proportional to a value of the output signal with a proportionality constant.

At S1850, the controller causes the modulation signal to have different logic values according to the comparison results and the timeout signal. In an embodiment, the controller causes the modulation signal to have a logic high value when the comparison signal is equal to or greater than the sense signal and the timeout signal has the logic high value.

Aspects of the present disclosure have been described in conjunction with the specific embodiments thereof that are proposed as examples. Numerous alternatives, modifications, and variations to the embodiments as set forth herein may be made without departing from the scope of the claims set forth below. Accordingly, embodiments as set forth herein are intended to be illustrative and not limiting.

What is claimed is:

1. A method for controlling a switching power supply, the method comprising:
converting an input signal into an output signal in response to a modulation signal;
generating a timeout signal in response to the modulation signal;
generating a comparison signal according to the output signal;
generating a first threshold signal having a value equal to a sum of a value of the comparison signal and a first threshold value, the first threshold value being proportional to a value of the output signal with a first proportionality constant;
generating a sense signal having a slew rate that is proportional to a second proportionality constant, the first proportionality constant being equal to or less than the second proportionality constant;
determining whether the comparison signal is equal to or greater than the sense signal;
determining whether the timeout signal has a first logic value; and
asserting the modulation signal to have the first logic value when the comparison signal is equal to or greater than the sense signal and the timeout signal has the first logic value.

2. The method of claim 1, further comprising:
determining whether the sense signal is equal to or greater than the first threshold signal; and
de-asserting the modulation signal to have a second logic value when the sense signal is equal to or greater than the first threshold signal.

3. The method of claim 2,
wherein the sense signal having a ramp waveform is generated when the modulation signal has the first logic value, the ramp waveform having the slew rate that is proportional to a ratio of a value of the input signal over a nominal switching period of the switching power supply with the second proportionality constant.

4. The method of claim 2, further comprising:
determining whether a second threshold signal is equal to or greater than the sense signal; and
asserting the modulation signal to have the first logic value when the second threshold signal is equal to or greater than the sense signal.

5. The method of claim 4, further comprising:
generating the second threshold signal having a value equal to the value of the comparison signal minus a second threshold value, the second threshold value being proportional to the value of the output signal with a third proportionality constant.

6. The method of claim 1, further comprising:
causing the comparison signal to be equal to or greater than the sense signal before the timeout signal has the first logic value when the switching power supply operates in a continuous current mode.

7. The method of claim 1, further comprising:
generating the sense signal according to the modulation signal, the input signal, and a signal indicative of an inductor current.

8. The method of claim 7, further comprising:
generating the sense signal that has a waveform indicative of the inductor current when the modulation signal has a second logic value.

9. The method of claim 1, further comprising:
de-asserting the timeout signal to have a second logic value in response to the modulation signal transitioning from the second logic value to the first logic value; and
maintaining the timeout signal to have the second logic value during a timer interval.

10. A switching power supply circuit comprising:
a power converter converting an input signal into an output signal in response to a modulation signal;
a timer circuit generating a timeout signal in response to the modulation signal; and
a controller determining whether a comparison signal is equal to or greater than a sense signal, determining whether the timeout signal has a first logic value, and asserting the modulation signal to have the first logic value when the comparison signal is equal to or greater than the sense signal and the timeout signal has the first logic value; and
wherein the controller includes a first threshold signal generator, and the first threshold signal generator outputs the comparison signal as a first threshold signal when the modulation signal has a second logic value, and outputs a signal that has a value equal to a sum of a value of the comparison signal and a first threshold value as the first threshold signal when the modulation signal has the first logic value.

11. The switching power supply circuit of claim 10, wherein the controller further determines whether the sense signal is equal to or greater than the first threshold signal, and de-asserts the modulation signal to have the second logic value when the sense signal is equal to or greater than the first threshold signal.

12. The switching power supply circuit of claim 11, wherein the first threshold value is proportional to a value of the output signal with a first proportionality constant,
wherein the sense signal has a ramp waveform when the modulation signal has the first logic value and the ramp waveform of the sense signal has a slew rate that is proportional to a ratio of a value of the input signal over a nominal switching period with a second proportionality constant, and
wherein the first proportionality constant is equal to or less than the second proportionality constant.

13. The switching power supply circuit of claim 11, wherein the first threshold generator receives the output signal, an inverted version of the modulation signal, and the comparison signal.

14. The switching power supply circuit of claim 13, wherein the power converter includes:
an output inductor storing energy or releasing the energy in response to the modulation signal to generate the output signal at a first end of the output inductor, a switching node signal being generated at a second end of the output inductor,
wherein the controller further includes:
a low-pass filter converting the switching node signal into a filtered signal; and
a second threshold generator receiving the filtered signal and generating a second threshold signal according to the received filtered signal, and
wherein the first threshold generator receives the filtered signal and generates the first threshold signal according to the filtered signal.

15. The switching power supply of claim 10, further comprising:
a current sense plus ramp (CSR) signal generator generating the sense signal according to the modulation signal, the input signal, and a signal indicative of an inductor current,
wherein the CSR signal generator includes:
a ramp generator including a ramp capacitor, the ramp generator generating a current in response to the input signal, causing the current to charge a ramp capacitor in response to the modulation signal, and generating the sense signal that has a ramp waveform when the modulation signal has the first logic value; and
a current sense circuit amplifying the signal indicative of the inductor current and providing the amplified signal to the ramp capacitor to generate the sense signal that has a waveform indicative of the inductor current when the modulation signal has the second logic value.

16. The switching power supply circuit of claim 15, wherein the ramp generator further includes:
an adaptive current source receiving the input signal and generating the current, the current having a magnitude proportional to a value of the input signal; and
a switching device transmitting the generated current to a first end of the ramp capacitor in response to the modulation signal.

17. The switching power supply circuit of claim 10, wherein the timer circuit includes:
a capacitor having a first end and a second end, the first end being connected to a ground;
a switching device connected to the capacitor in parallel;
an adaptive current source providing a current to charge the capacitor; and
a comparator comparing a voltage at the second end of the capacitor with a reference voltage and outputting the timeout signal in response to the comparison result.

18. The switching power supply circuit of claim 10, wherein the controller includes:
a current sense plus ramp (CSR) signal generator generating the sense signal according to the modulation signal, the input signal, and a current sense signal, and
wherein the power converter includes:
an output inductor storing energy or releasing the energy in response to the modulation signal; and
an inductor current sensor connected to the output inductor in parallel, the inductor current sensor outputting the current sense signal indicative of an inductor current flowing through the output inductor.

19. The switching power supply circuit of claim 10, wherein the switching power supply circuit is a multi-phase power supply circuit, the modulation signal is a selected one of a plurality of modulation signals, and the sense signal is a selected one of a plurality of sense signals, and
wherein the controller includes a current sense plus ramp (CSR) signal generator generating the plurality of sense signals according to the plurality of modulation signals, the input signal, and a plurality of current sense signals.

20. The switching power supply circuit of claim 19, wherein the controller further includes:
a select signal generator setting one of a plurality of phase select signals to an active state according to the plurality of modulation signals; and
a multiplexer selecting one of the plurality of the sense signals as the sense signal in response to the plurality of phase select signals.

21. A control circuit for controlling a switching power supply, comprising:
an amplifier circuit generating a comparison signal in response to an output signal of the switching power supply;
a first threshold signal generator generating a first threshold signal based on the comparison signal;
a second threshold signal generator generating a second threshold signal based on the comparison signal;
a timer circuit generating a timeout signal in response to a modulation signal; and
a first comparator determining whether the comparison signal is equal to or greater than a sense signal to assert the modulation signal to have a first logic value when the comparison signal is equal to or greater than the sense signal and the timeout signal has the first logic value,
wherein the first threshold signal generator generates the first threshold signal having a value equal to a sum of a value of the comparison signal and a first threshold value, the first threshold value being proportional to a value of the output signal with a first proportionality constant, the sense signal having a slew rate that is proportional to a second proportionality constant, the first proportionality constant being equal to or less than the second proportionality constant.

22. The control circuit of claim 21, further comprising:
a second comparator determining whether the second threshold signal is equal to or greater than the sense signal to assert the modulation signal to have the first logic value when the second threshold signal is equal to or greater than the sense signal.

* * * * *